US011658747B2

(12) United States Patent
Morita et al.

(10) Patent No.: US 11,658,747 B2
(45) Date of Patent: May 23, 2023

(54) OPTICAL COMMUNICATION APPARATUS, OPTICAL COMMUNICATION METHOD, AND OPTICAL COMMUNICATION SYSTEM

(71) Applicant: SONY GROUP CORPORATION, Tokyo (JP)

(72) Inventors: Hiroshi Morita, Tokyo (JP); Kazuaki Toba, Tokyo (JP); Masanari Yamamoto, Tokyo (JP); Yusuke Oyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/423,180

(22) PCT Filed: Jan. 16, 2020

(86) PCT No.: PCT/JP2020/001394
§ 371 (c)(1),
(2) Date: Jul. 15, 2021

(87) PCT Pub. No.: WO2020/153236
PCT Pub. Date: Jul. 30, 2020

(65) Prior Publication Data
US 2022/0131609 A1 Apr. 28, 2022

(30) Foreign Application Priority Data
Jan. 24, 2019 (JP) .............................. JP2019-010508

(51) Int. Cl.
*H04B 10/2581* (2013.01)
*G02B 6/38* (2006.01)

(52) U.S. Cl.
CPC ....... *H04B 10/2581* (2013.01); *G02B 6/3853* (2013.01); *G02B 6/3882* (2013.01)

(58) Field of Classification Search
CPC .............. H04B 10/2581; G02B 6/3853; G02B 6/3882
(Continued)

(56) References Cited

U.S. PATENT DOCUMENTS

| 4,915,468 A | * | 4/1990 | Kim | ...................... G01D 5/344 385/28 |
| 8,223,323 B2 | * | 7/2012 | Nakanishi | .............. G01M 11/33 356/73.1 |

(Continued)

FOREIGN PATENT DOCUMENTS

| CN | 1396724 A | | 2/2003 | |
| CN | 102959465 B | * | 3/2016 | ........... H01S 3/0057 |

(Continued)

OTHER PUBLICATIONS

International Search Report and Written Opinion of PCT Application No. PCT/JP2020/001394, dated Mar. 3, 2020, 08 pages of ISRWO.

*Primary Examiner* — Abbas H Alagheband
(74) *Attorney, Agent, or Firm* — Chip Law Group

(57) ABSTRACT

There is provided an optical waveguide that performs propagation only in a reference mode at a first wavelength. Communication is performed using light of a second wavelength that enables the optical waveguide to perform propagation in at least a first order mode in addition to the reference mode. When light entering the optical waveguide deviates with respect to an optical axis or deviates angularly, propagation is performed in at least the first order mode in addition to the reference mode, the first order mode being generated due to the deviation with respect to the optical axis or the angular deviation. This results in a reduction in a loss of coupling of optical power. This makes it possible to relax the accuracy with respect to a deviation with respect to an optical axis or an angular deviation, and thus to reduce costs.

10 Claims, 23 Drawing Sheets

(58) Field of Classification Search
USPC ........................................................ 398/141
See application file for complete search history.

(56) References Cited

U.S. PATENT DOCUMENTS

| | | | | |
|---|---|---|---|---|
| 2001/0017961 | A1* | 8/2001 | Kittaka | G02B 6/2937 385/34 |
| 2001/0053262 | A1* | 12/2001 | Kinoshita | G02B 6/29361 385/24 |
| 2003/0031408 | A1* | 2/2003 | Ota | G02B 6/14 385/27 |
| 2007/0147752 | A1* | 6/2007 | Weisberg | G02B 6/02304 385/125 |
| 2007/0196061 | A1* | 8/2007 | Bickham | G02B 6/02223 385/123 |
| 2008/0273850 | A1* | 11/2008 | Imamura | G02B 6/02242 385/126 |
| 2011/0110627 | A1* | 5/2011 | Tsai | G02B 6/262 385/33 |
| 2011/0211788 | A1* | 9/2011 | Yamamoto | G02B 6/03627 385/28 |
| 2019/0222309 | A1* | 7/2019 | Gross | H04B 10/077 |
| 2019/0361170 | A1* | 11/2019 | Bickham | G02B 6/02009 |
| 2021/0133614 | A1* | 5/2021 | Ashrafi | G06N 10/00 |

FOREIGN PATENT DOCUMENTS

| | | | | |
|---|---|---|---|---|
| JP | 08-288911 | A | | 11/1996 |
| JP | 2003-021723 | A | | 1/2003 |
| JP | 2010139381 | A | * | 6/2010 |
| JP | 2013-034134 | A | | 2/2013 |
| JP | 2017-050660 | A | | 3/2017 |
| JP | 2017072495 | A | * | 4/2017 |
| WO | WO-2007043558 | A1 | * | 4/2007 ............. G02B 6/421 |
| WO | WO-2016167080 | A1 | * | 10/2016 ......... G02B 6/02009 |
| WO | 2017/056889 | A1 | | 4/2017 |

* cited by examiner

Wavelength of
propagating light : 1310nm
Core diameter : 8um
NA : 0.1

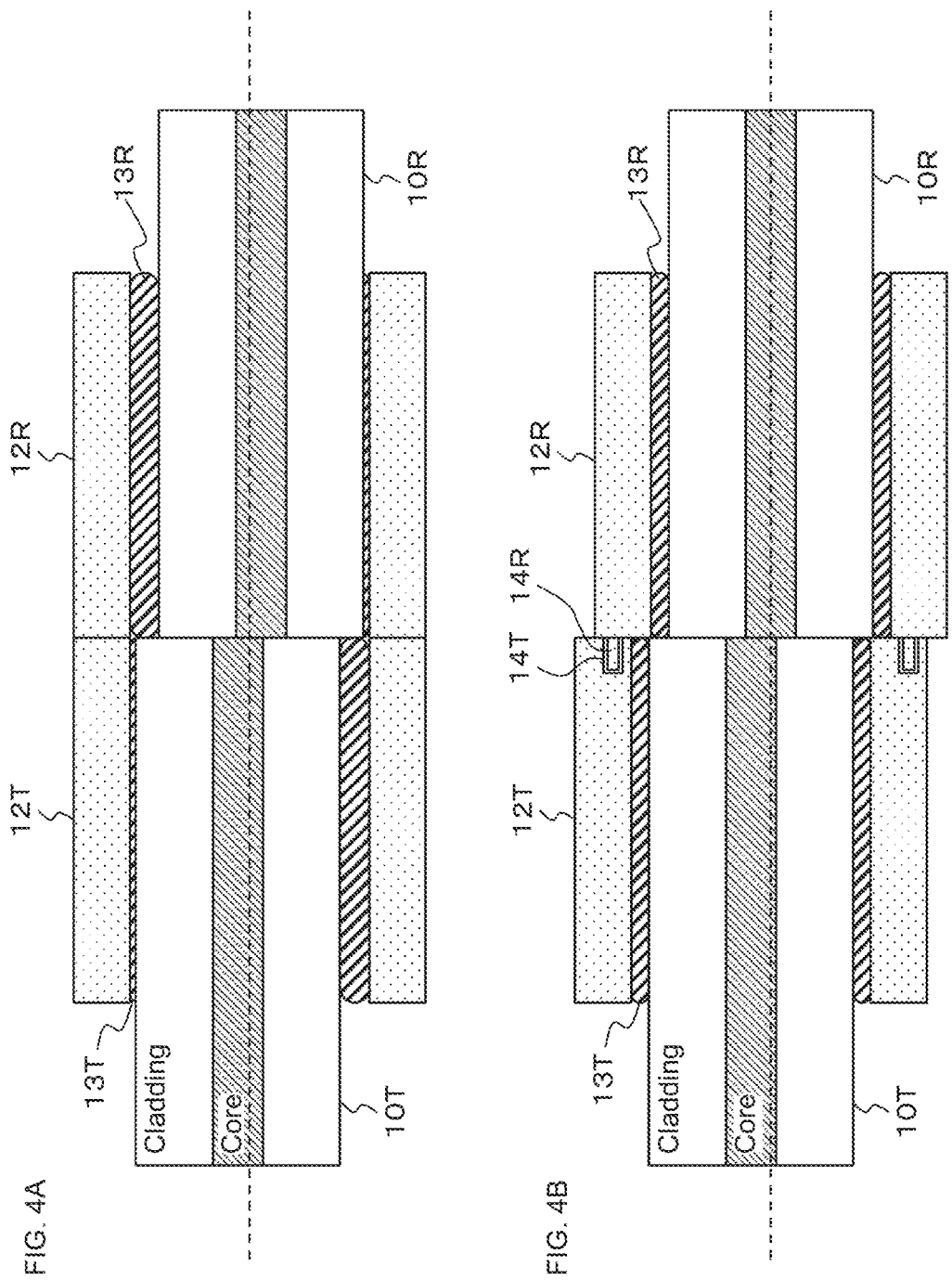

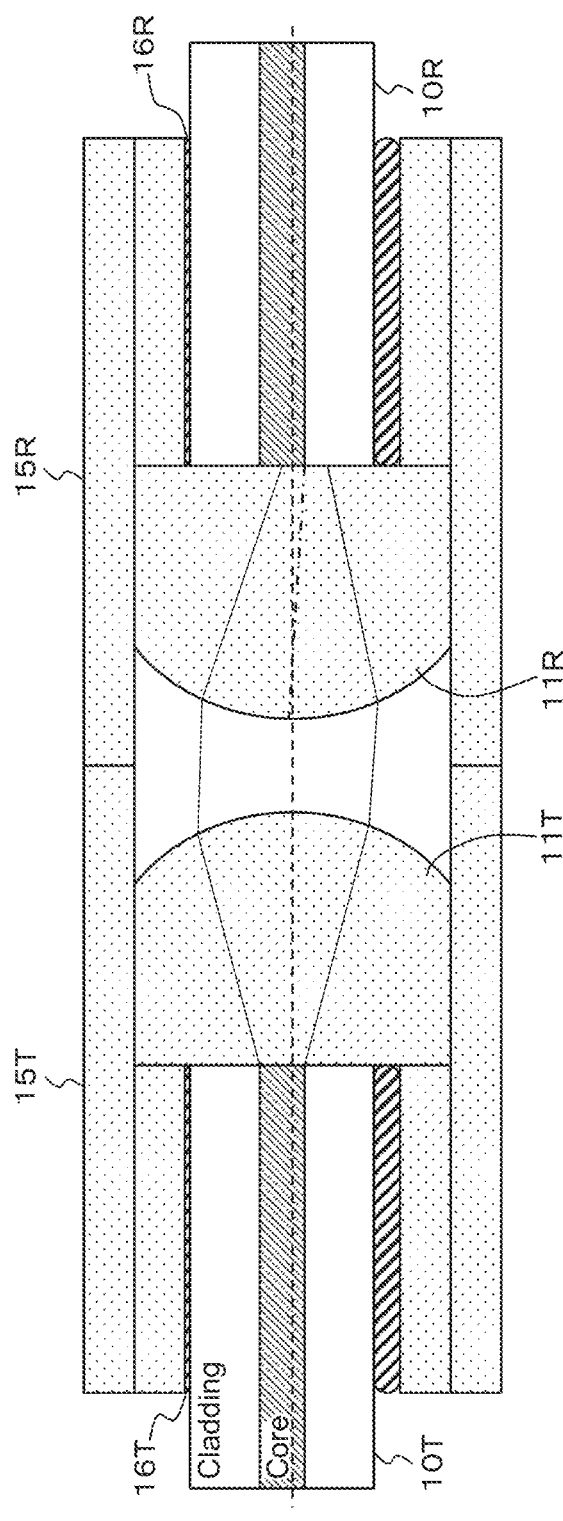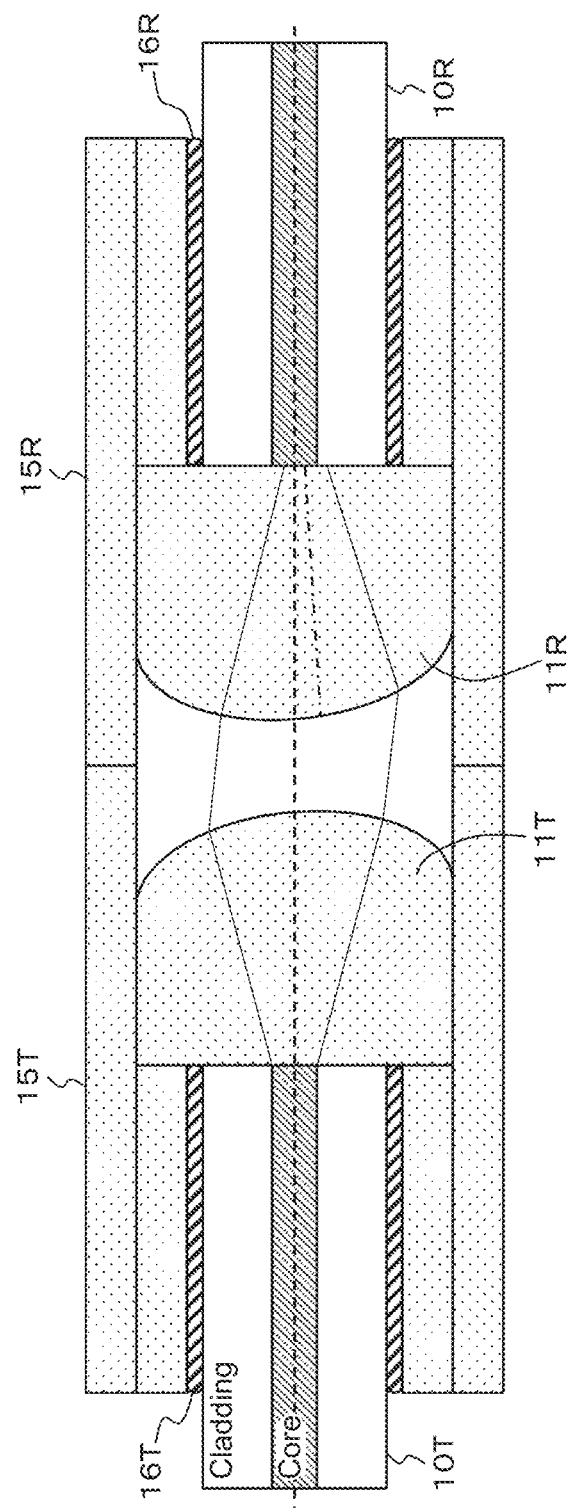

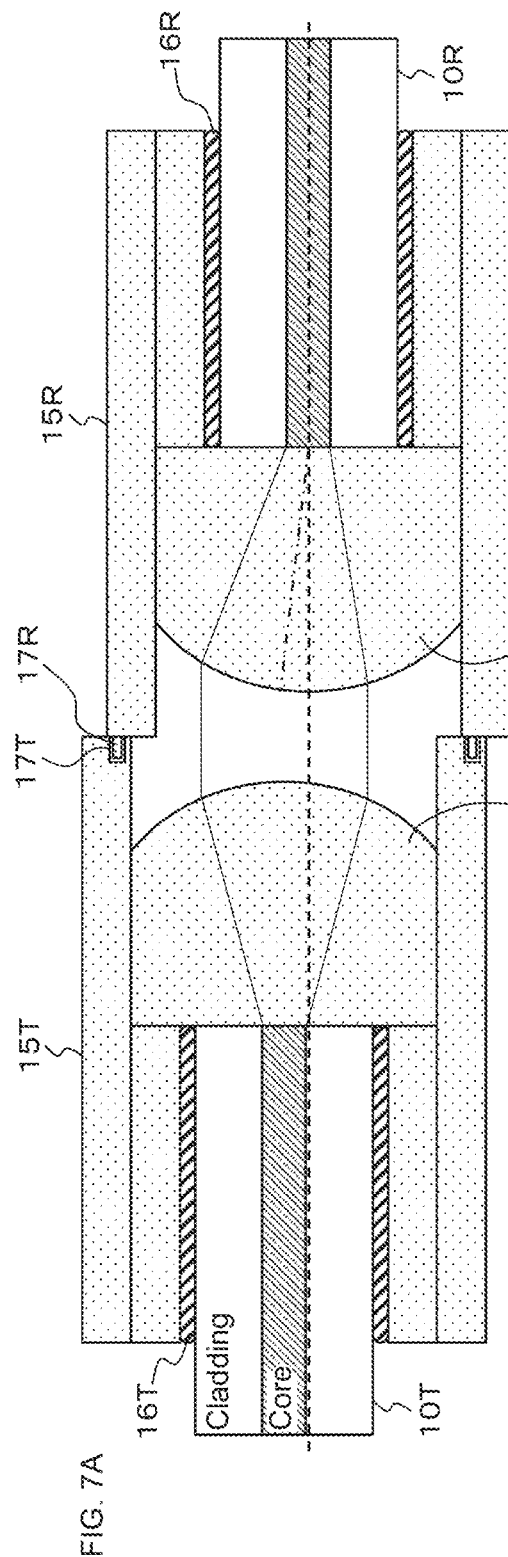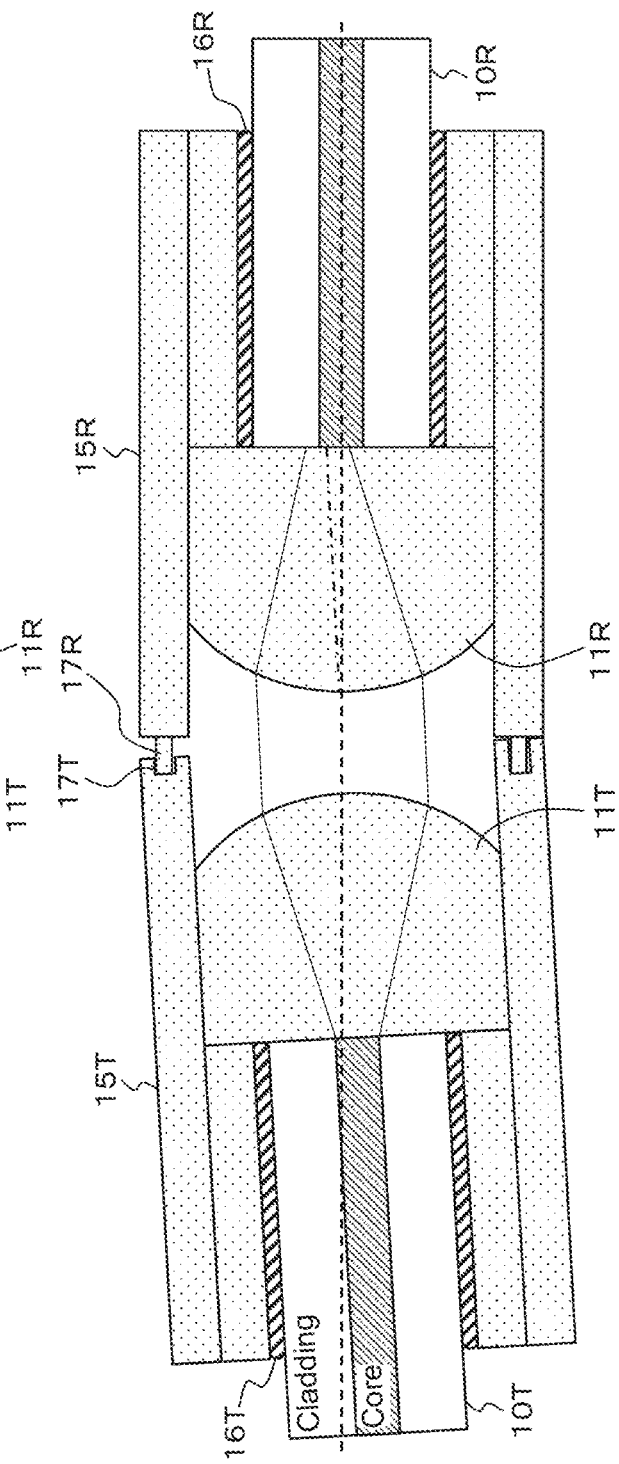

FIG. 8A
Wavelength of
propagating light: 850nm
Core diameter: 8um
NA: 0.1
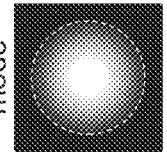
Reference mode
+
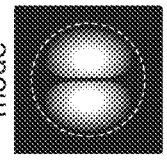
First order mode
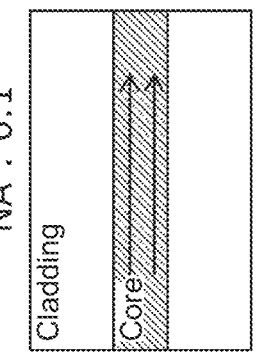
FIG. 8B
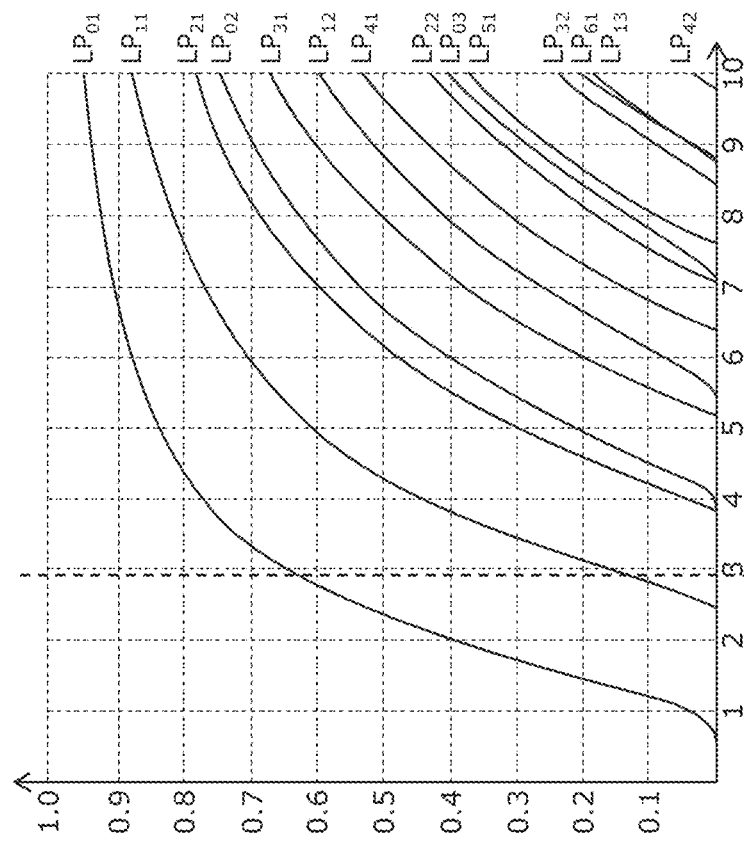

ered to as the "optical fiber PC" hereinafter) of an optical fiber according to an embodiment of the present technology, and FIG. 1B illustrates

OPTICAL COMMUNICATION APPARATUS, OPTICAL COMMUNICATION METHOD, AND OPTICAL COMMUNICATION SYSTEM

CROSS REFERENCE TO RELATED APPLICATIONS

This application is a U.S. National Phase of International Patent Application No. PCT/JP2020/001394 filed on Jan. 16, 2020, which claims priority benefit of Japanese Patent Application No. JP 2019-010508 filed in the Japan Patent Office on Jan. 24, 2019. Each of the above-referenced applications is hereby incorporated herein by reference in its entirety.

TECHNICAL FIELD

The present technology relates to an optical communication apparatus, an optical communication method, and an optical communication system. In particular, the present technology relates to, for example, an optical communication apparatus that makes it possible to relax the accuracy with respect to a deviation with respect to an optical axis or an angular deviation.

BACKGROUND ART

An optical communication performed by spatial coupling (for example, refer to Patent Literature 1) and an optical communication performed using a physical contact (PC) have been known in the past. Due to a deviation with respect to an optical axis or an angular deviation, these optical communications have significant losses of optical power, in particular, in a single-mode fiber. This makes great demands for the accuracy of a component in order to prevent a deviation with respect to an optical axis or an angular deviation. This results in an increase in costs.

CITATION LIST

Patent Literature

Patent Literature 1: WO2017/056889

DISCLOSURE OF INVENTION

Technical Problem

An object of the present technology is to relax the accuracy necessary with respect to a deviation with respect to an optical axis or an angular deviation, and thus to reduce costs.

Solution to Problem

A concept of the present technology provides an optical communication apparatus that includes an optical waveguide that performs propagation only in a reference mode at a first wavelength, the optical communication apparatus performing communication using light of a second wavelength that enables the optical waveguide to perform propagation in at least a first order mode in addition to the reference mode.

In the present technology, an optical waveguide is included that performs propagation only in a reference mode at a first wavelength. For example, the optical waveguide may be an optical fiber or a silicon optical waveguide.

Further, for example, the first wavelength may be a wavelength at which a wavelength dispersion is zero. Furthermore, for example, the first wavelength may be a wavelength of between 300 nm and 5 µm. Moreover, for example, the first wavelength may be a wavelength in a 1310 nm band or a wavelength in a 1550 nm band.

Further, in the present technology, the optical communication apparatus performs communication using light of a second wavelength that enables the optical waveguide to perform propagation in at least a first order mode in addition to the reference mode. In this case, for example, the second wavelength may be a wavelength in an 850 nm band.

As described above, in the present technology, an optical waveguide is included that performs propagation only in a reference mode at a first wavelength, and communication is performed using light of a second wavelength that enables the optical waveguide to perform propagation in at least a first order mode in addition to the reference mode. Thus, when light entering the optical waveguide deviates with respect to an optical axis or deviates angularly, propagation is performed in at least the first order mode in addition to the reference mode, the first order mode being generated due to the deviation with respect to the optical axis or the angular deviation. This results in a reduction in a loss of coupling of optical power. This makes it possible to relax the accuracy with respect to a deviation with respect to an optical axis or an angular deviation, and thus to reduce costs.

Further, another concept of the present technology provides an optical communication system that includes a reception section that includes an optical waveguide that performs propagation only in a reference mode at a first wavelength, and a transmission section from which light of a second wavelength enters the optical waveguide of the reception section, the second wavelength enabling the optical waveguide to perform propagation in at least a first order mode in addition to the reference mode.

In the present technology, a reception section and a transmission section are included. The reception section includes an optical waveguide that performs propagation only in a reference mode at a first wavelength. Light of a second wavelength enters the optical waveguide of the reception section from the transmission section, the second wavelength enabling the optical waveguide to perform propagation in at least a first order mode in addition to the reference mode. For example, the transmission section may be a light-emitting element, a receptacle of a transmitter, or a plug of a cable.

As described above, in the present technology, a reception section includes an optical waveguide that performs propagation only in a reference mode at a first wavelength, and light of a second wavelength enters the optical waveguide from a transmission section, the second wavelength enabling the optical waveguide to perform propagation in at least a first order mode in addition to the reference mode. Thus, when light entering the optical waveguide deviates with respect to an optical axis or deviates angularly, propagation is performed in at least the first order mode in addition to the reference mode, the first order mode being generated due to the deviation with respect to the optical axis or the angular deviation. This results in a reduction in a loss of coupling of optical power. This makes it possible to relax the accuracy with respect to a deviation with respect to an optical axis or an angular deviation, and thus to reduce costs.

BRIEF DESCRIPTION OF DRAWINGS

FIGS. 4A and 4B illustrate an example of the optical communication performed by the PC connection.

FIGS. 6A and 6B illustrate an example of the optical communication performed by the spatial coupling.

FIGS. 7A and 7B illustrate an example of the optical communication performed by the spatial coupling.

FIGS. 8A and 8B are diagrams describing the fact that there may be a reference mode LP01 and a first order mode LP11 when light of a wavelength of 850 nm is input to a 1310 nm single-mode fiber.

MODE(S) FOR CARRYING OUT THE INVENTION

Embodiments for carrying out the present technology (hereinafter referred to as "embodiments") will now be described below. Note that the description is made in the following order.
1. Embodiments
2. Modifications

1. Embodiments

[Basic Description of Present Technology]

Figure 1A:
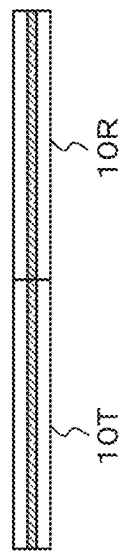
FIGS. 1A and 1B illustrate outlines of optical communications respectively performed by a physical contact (PC) connection and spatial coupling.
Figure 1B:
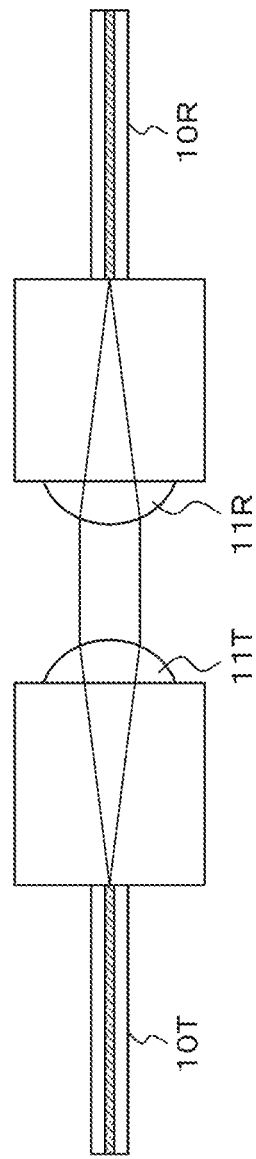

First, a technology related to the present technology is described. FIG. 1A illustrates an outline of an optical communication performed by a physical contact (PC) connection. In this case, an optical communication is performed in a state in which an end surface of an optical fiber 10T on the transmission side and an end surface of an optical fiber 10R on the reception side are in contact with each other. Further, FIG. 1B illustrates an outline of an optical communication performed by spatial coupling. In this case, light exiting from the optical fiber 10T on the transmission side is formed into collimated light by a lens 11T on the transmission side, and the collimated light exits from the lens 11T. Then, the collimated light is collected by a lens 11R on the reception side, and enters the optical fiber 10R on the reception side. Due to a deviation with respect to an optical axis or an angular deviation, these optical communications have significant losses of optical power, in particular, in a single-mode fiber.

Next, a basic idea about a mode is described. In order to perform propagation through an optical fiber in a single mode, there is a need to determine parameters for the fiber, such as a refractive index and a core diameter, such that there is only one mode.

Figure 2B:
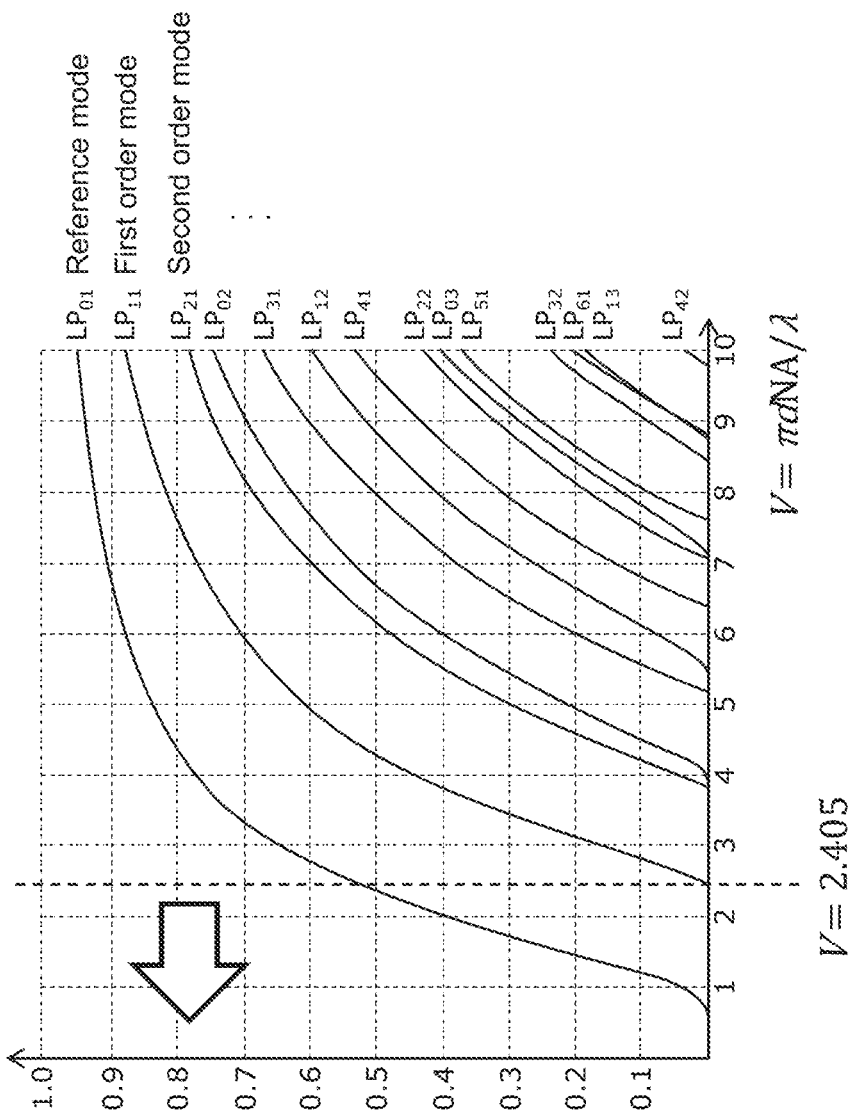
FIGS. 2A and 2B is a are diagrams illustrating a basic structure of an optical fiber and a linearly polarized mode (LPml mode) for a step-index optical fiber.
Figure 2A:
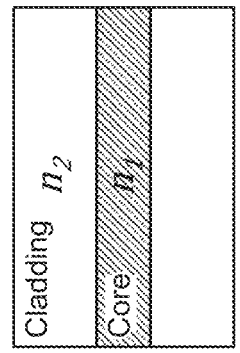

FIG. 2A illustrates a basic structure of an optical fiber. The optical fiber has a structure in which a center portion called "core" is covered with a layer called "cladding". In this case, a refractive index n1 of the core is set high, and a refractive index n2 of the cladding is set low. Light in a state of being confined in the core propagates.

FIG. 2B illustrates a linearly polarized mode (LPml mode) for a step-index optical fiber, where a normalized propagation constant b is given in the form of a function of a normalized frequency V. The vertical axis represents the normalized propagation constant b, where b=0 when propagation is not performed in a certain mode (a certain mode is interrupted), and b has a value closer to 1 as a larger amount of optical power is confined in a core (can be propagated). The horizontal axis represents the normalized frequency V, and the normalized frequency V can be represented by Formula (1) indicated below. Here, d is a core diameter, NA is a numerical aperture, and λ is a light wavelength.

$$V=\pi d NA/\lambda \qquad (1)$$

For example, when V=2.405, LP11 is interrupted, and thus LP01 is a sole existing mode. Thus, a state in which V is equal to or less than 2.405 corresponds to a state of a single mode. Here, LP01 is a reference mode (zero order mode), and subsequently, LP11, LP21, . . . are a first order mode, a second order mode . . . , respectively.

Figures 3A, 3B:
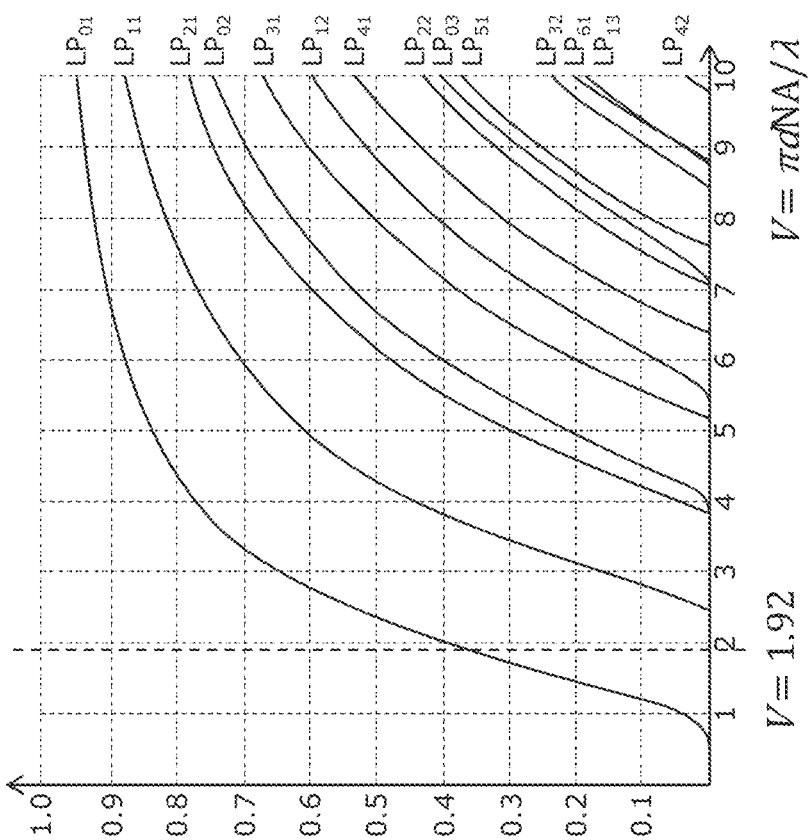
FIGS. 3A and 3B is a are diagrams used to discuss a normalized frequency V in the case of 1310 nm, which is a typical wavelength for a single mode.
Figure 5:
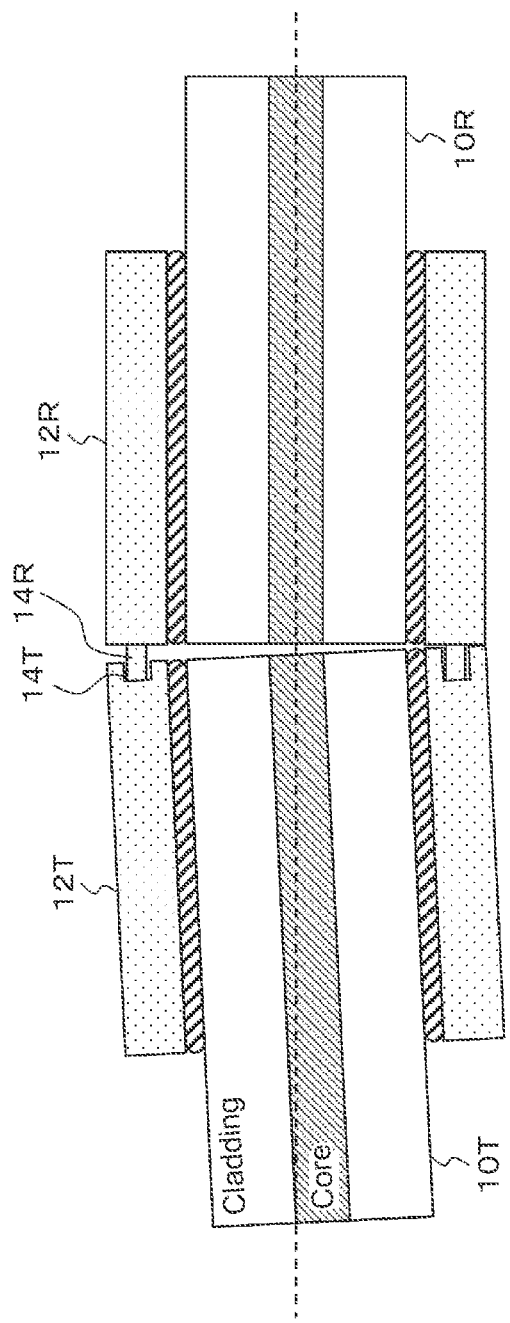
FIG. 5 illustrates an example of the optical communication performed by the PC connection.

For example, the normalized frequency V in the case of 1310 nm, as illustrated in FIG. 3A, is discussed, where 1310 nm is a typical wavelength for the single mode. Here, when the core diameter d is 8 μm and the numerical aperture NA is 0.1, which respectively represent typical parameters for a 1310 nm optical fiber, and when the wavelength of light that propagates through the fiber is 1310 nm, V=1.92 is obtained using Formula (1).

Thus, the normalized frequency V is equal to or less than 2.405, as illustrated in FIG. 3B. Consequently, propagation is performed only in the reference mode LP01, and this results in propagation being performed in a single mode. Here, the number of modes in which propagation can be performed is increased as the core diameter becomes larger. Note that, for example, a typical multimode fiber has a core diameter of, for example, 50 μm, and this results in propagation being performed in several hundred modes.

In the case of the optical communications as illustrated in FIGS. 1A and 1B, there is a need to strictly align an optical coupling portion on the transmission side with an optical coupling portion on the reception side in the single mode, since the core diameter for the single mode is small. This makes greater demands for the accuracy in order to perform an accurate alignment with respect to an optical axis.

Typically, a precision component is used or a portion for inputting light to an optical fiber is processed to facilitate an insertion of light into a core of a fiber, in order to solve the issue described above. However, the precision component is expensive, and the necessity for processing results in an increase in costs for the processing. Thus, a connector and a system that are used for a single-mode communication are generally expensive.

An example of a factor of a reduction in the accuracy in optical-axis alignment is described. FIGS. 4A, 4B, 5A, and 5B illustrate examples of optical communications performed by a PC connection. In the case of the PC connection, misalignment of core may occur due to an amount of a fixation material 13T and an amount of a fixation material 13R not being the same as each other, as illustrated in, for example, FIG. 4A, the fixation materials 13T and 13R being used to fix ferrules 12T and 12R to the optical fibers 10T and 10R.

Further, In the case of the PC connection, misalignment of core may occur due to lack of accuracy of an alignment mechanism (a concave portion 14T and a convex portion 14R) that is provided to the ferrules 12T and 12R, as illustrated in, for example, FIG. 4B. Note that the convex portion 14R illustrated in FIG. 4B may be a pin. Further, in the case of the PC connection, the optical axis may be tilted due to lack of accuracy in processing the alignment mechanism (the concave portion 14T and the convex portion 14R) that is provided to the ferrules 12T and 12R, as illustrated in, for example, FIG. 5.

FIGS. 6A, 6B, 7A, and 7B illustrate examples of optical communications performed by optical coupling. In the case of the optical coupling, a deviation with respect to an optical axis or an angular deviation may occur due to an amount of a fixation material 16T and an amount of a fixation material 16R not being the same as each other, as illustrated in, for example, FIG. 6A, the fixation materials 16T and 16R being used to fix ferrules 15T and 15R to the optical fibers 10T and 10R. Further, in the case of the optical coupling, a deviation with respect to an optical axis or an angular deviation may occur due to lack of accuracy in producing the lenses 11T and 11R, as illustrated in, for example, FIG. 6B.

Further, a deviation with respect to an optical axis or an angular deviation may occur due to lack of accuracy of an alignment mechanism (a concave portion 17T and a convex portion 17R) that is provided to the ferrules 15T and 15R, as illustrated in FIGS. 7A and 7B. Note that the convex portion 17R illustrated in FIGS. 7A and 7B may be a pin.

The present technology uses two or more modes, that is, a reference mode and at least a first order mode, and makes it possible to relax the accuracy with respect to a positional deviation or an angular deviation, and thus to reduce costs. For example, when light of a wavelength of 850 nm, instead of 1310 nm, is input to an optical fiber with the same condition as FIG. 3A, the normalized frequency V=2.96, as illustrated in FIG. 8B. Thus, there may be the reference mode LP01 and the first order mode LP11, as illustrated in FIG. 8A.

Figure 9A:
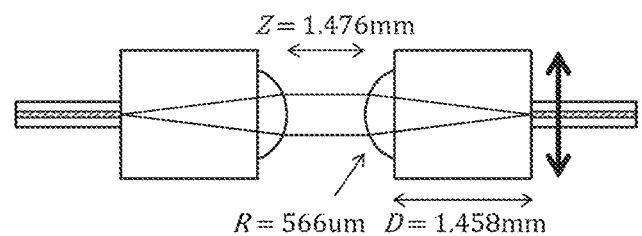
FIGS. 9A and 9B are diagrams used to discuss the case in which a deviation with respect to an optical axis occurs under the condition that there is only the reference mode LP01 for input light.
Figure 9B:
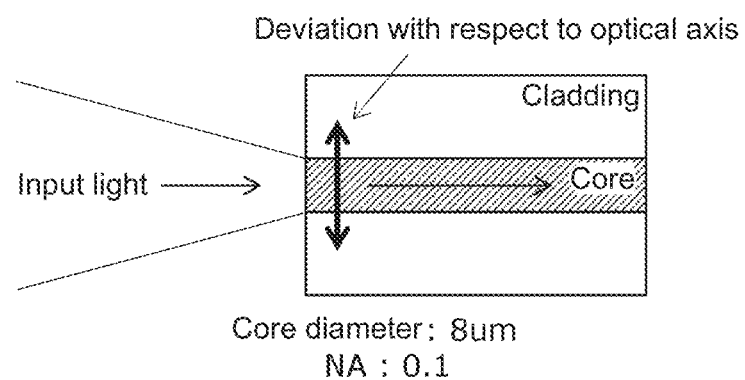

The following case is discussed: under the condition that there is only the reference mode LP01 for input light when an optical system as illustrated in FIG. 9A is formed, the position of an optical fiber on the reception side is shifted in a direction vertical to an optical axis (refer to arrows in FIGS. 9A and 9B), that is, a deviation with respect to an optical axis occurs.

Figure 10:
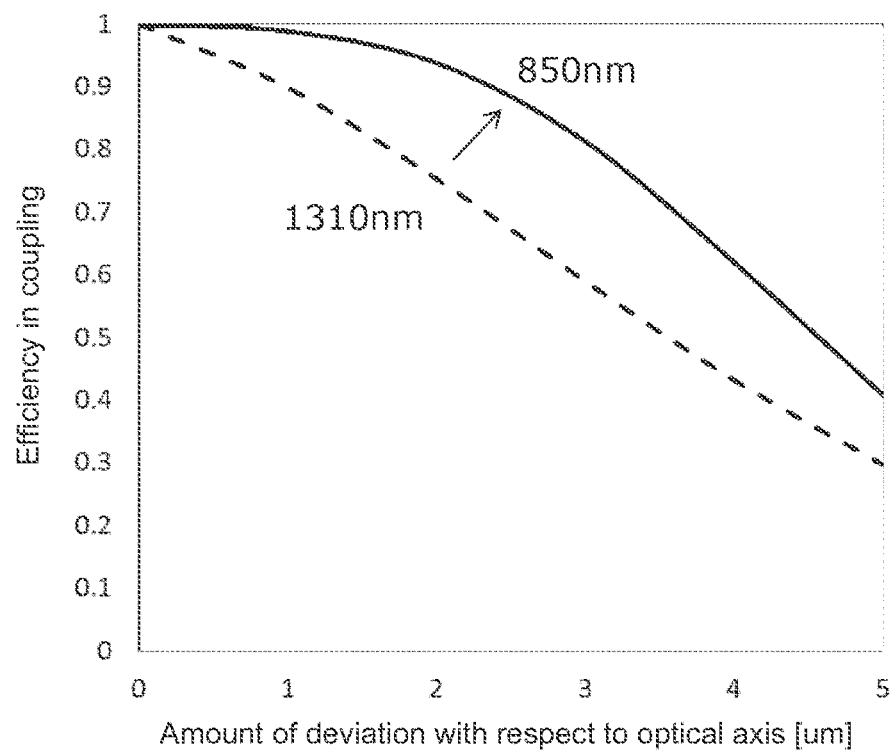
FIG. 10 is a graph of a result of simulating amounts of loss when a wavelength of input light is 1310 nm and when the wavelength of the input light is 850 nm.

FIG. 10 is a graph of a result of simulating an amount of loss in the case described above. The horizontal axis represents an amount of a deviation with respect to an optical axis, and the vertical axis represents the efficiency in coupling. When there is no deviation, 100% of power propagates through an optical fiber, where the efficiency in coupling is 1. Further, when, for example, only 50% of the power in input light propagates through the optical fiber, the efficiency in coupling is 0.5.

When the case in which a wavelength of the input light is 1310 nm and the case in which the wavelength of the input light is 850 nm are compared, it is understood, from the comparison, that better characteristics are exhibited in the case of 850 nm. The reason is that propagation is performed only in the reference mode in the case of 1310 nm, whereas propagation is performed in the first order mode in addition to the reference mode in the case of 850 nm (refer to FIG. 8A).

Figure 11A:
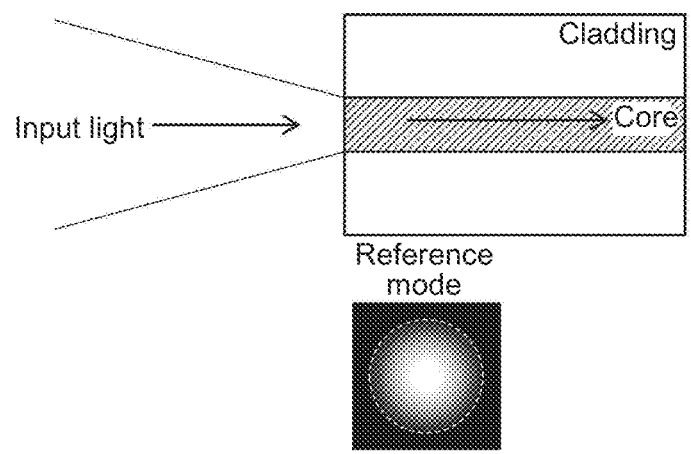
FIGS. 11A and 11B illustrate the fact that there is only a reference mode for input light when there is no deviation with respect to an optical axis, whereas a portion of the reference mode is converted into a first order mode when there is a deviation with respect to an optical axis.
Figure 11B:
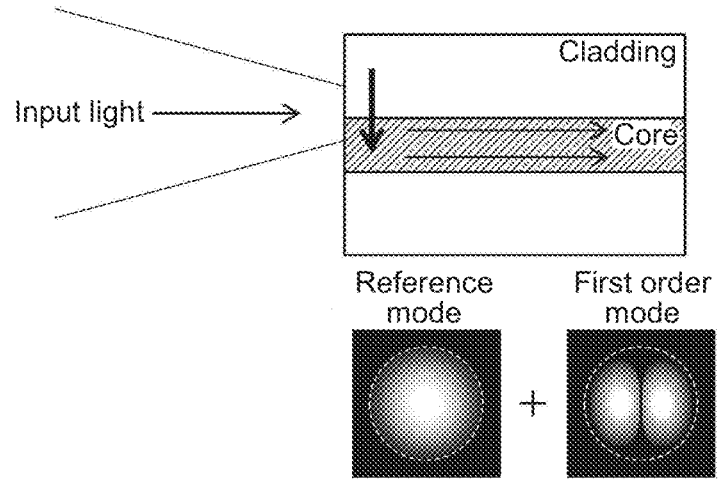

In other words, when there is no deviation with respect to an optical axis, there is only a reference mode for input light, as illustrated in FIG. 11A. On the other hand, when there is a deviation with respect to an optical axis, a portion of the reference mode is converted into a first order mode using a phase difference caused due to a difference in refractive index between cladding and a core, as illustrated in FIG. 11B. Propagation is not allowed to be performed in the first order mode in the case of 1310 nm, whereas propagation can also be performed in the first order mode in the case of 850 nm. Thus, better characteristics are exhibited in the case of 850 nm.

Figure 12:
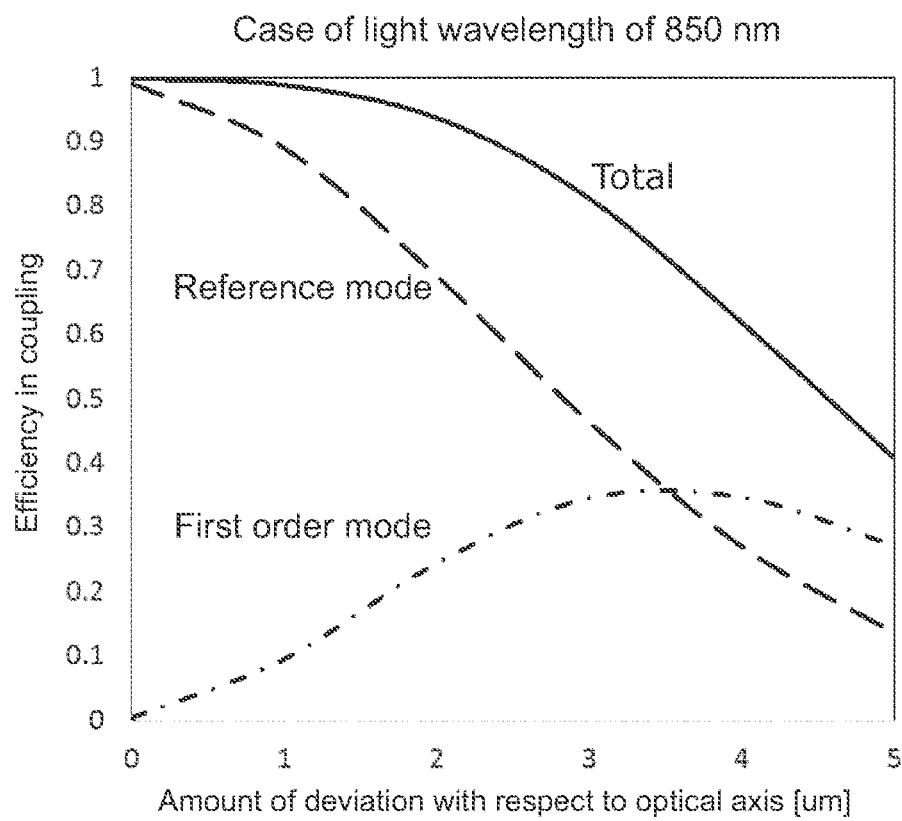
FIG. 12 is a graph describing the fact that the reference mode is converted into the first order mode according to the deviation.

In a graph of FIG. 12, a component of a reference mode (zero order mode) and a component of a first order mode are separately given, and the sum of them is represented by a curve Total. It is understood that the reference mode is converted into the first order mode according to the deviation since there is only the reference mode for input light. On the other hand, in the case of 1310 nm, there is a simple reduction in reference mode, as illustrated in FIG. 10, since propagation is performed only in the reference mode, as illustrated in FIG. 3A.

The case of 1310 nm and the case of 850 nm are compared with reference to FIG. 10. It is possible to relax the accuracy with respect to a positional deviation by a factor of about 1.8 when the comparison is performed at an efficiency in coupling of 0.8 (about −1 dB), and to relax the accuracy with respect to a positional deviation by a factor of about 2.35 when the comparison is performed at an efficiency in coupling of 0.9 (about −0.5 dB).

Figure 13A:
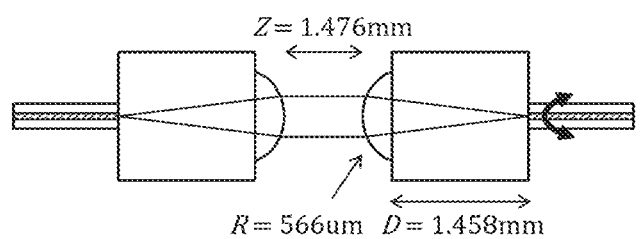
FIGS. 13A and 13B are diagrams used to discuss the case in which an angular deviation occurs under the condition that there is only the reference mode LP01 for input light.
Figure 13B:
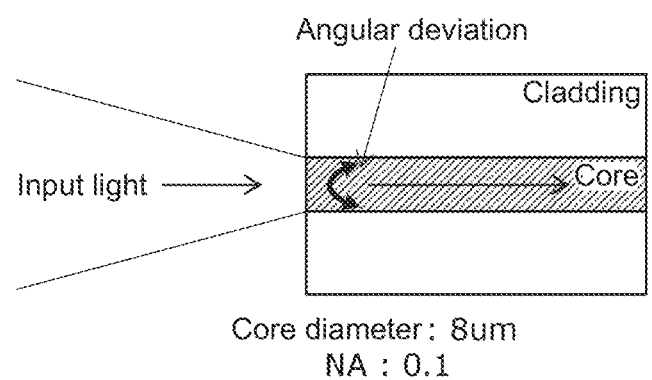

Further, the following case is discussed: under the condition that there is only the reference mode LP01 for input light when an optical system as illustrated in FIG. 13A is formed, the angle of an optical fiber on the reception side is shifted with respect to an optical axis (refer to arrows in FIGS. 13A and 13B), that is, an angular deviation occurs.

Figure 14:
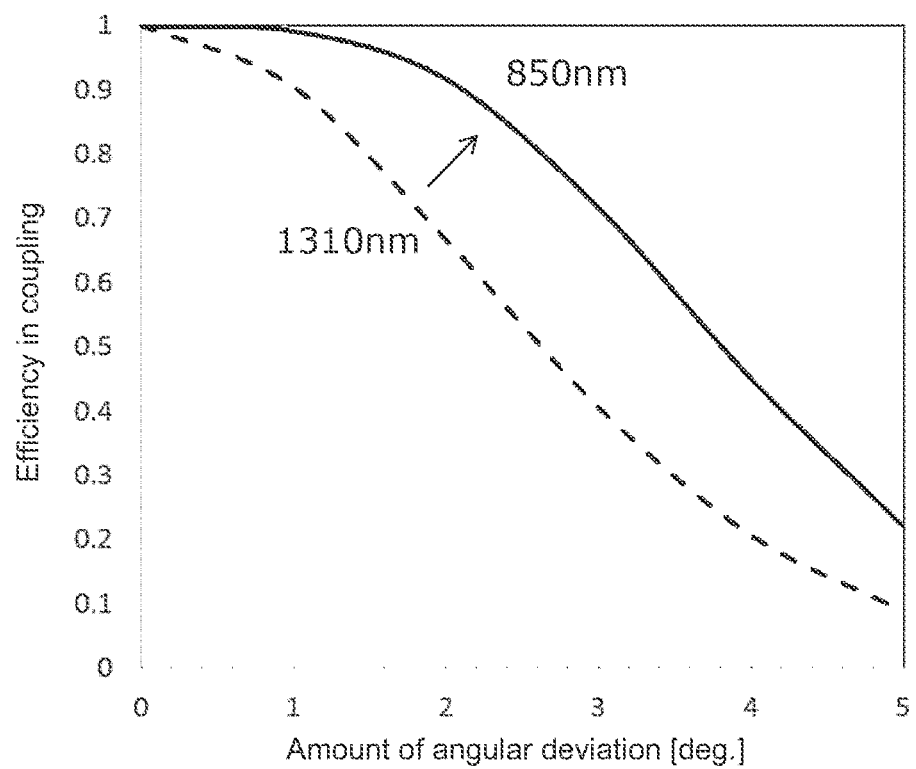
FIG. 14 is a graph of a result of simulating amounts of loss when a wavelength of input light is 1310 nm and when the wavelength of the input light is 850 nm.

FIG. 14 is a graph of a result of simulating an amount of loss in the case described above. The horizontal axis represents an amount of an angular deviation, and the vertical axis represents the efficiency in coupling. When there is no deviation, 100% of power propagates through an optical fiber, where the efficiency in coupling is 1. Further, when, for example, only 50% of the power in input light propagates through the optical fiber, the efficiency in coupling is 0.5.

When the case in which a wavelength of the input light is 1310 nm and the case in which the wavelength of the input light is 850 nm are compared, it is understood, from the comparison, that better characteristics are exhibited in the case of 850 nm. The reason is that propagation is performed only in the reference mode in the case of 1310 nm, whereas propagation is performed in the first order mode in addition to the reference mode in the case of 850 nm (refer to FIG. 8A).

Figure 15A:
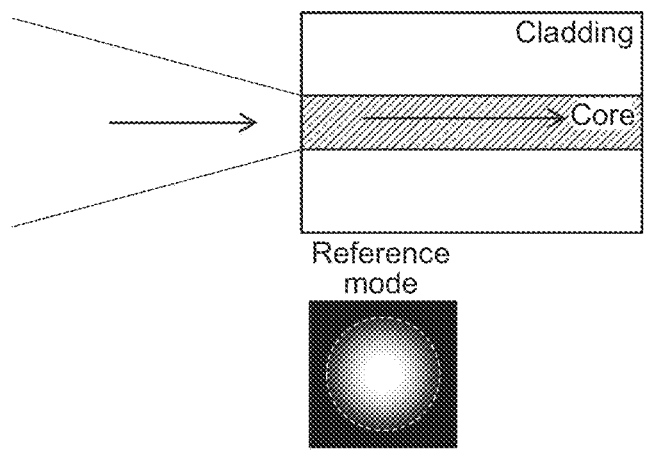
FIGS. 15A and 15B illustrate the fact that there is only a reference mode for input light when there is no angular deviation, whereas a portion of the reference mode is converted into a first order mode when there is an angular deviation.
Figure 15B:
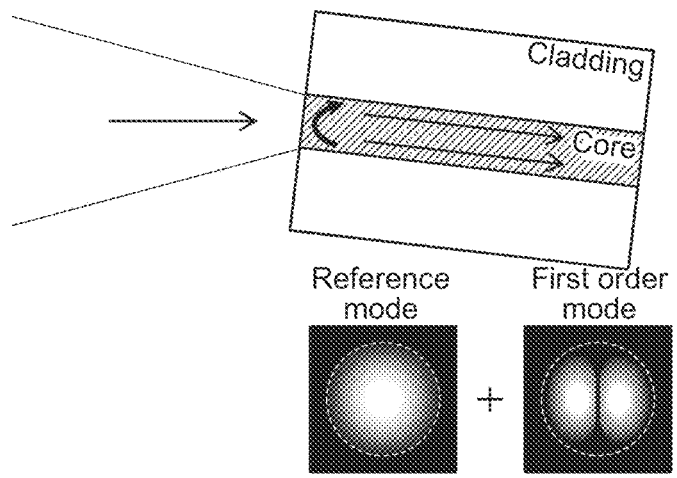

In other words, when there is no angular deviation, there is only a reference mode for input light, as illustrated in FIG. 15A. On the other hand, when there is an angular deviation, a portion of the reference mode is converted into a first order mode using a difference in input phase, as illustrated in FIG. 15B. Propagation is not allowed to be performed in the first order mode in the case of 1310 nm, whereas propagation can also be performed in the first order mode in the case of 850 nm. Thus, better characteristics are exhibited in the case of 850 nm.

Figure 16:
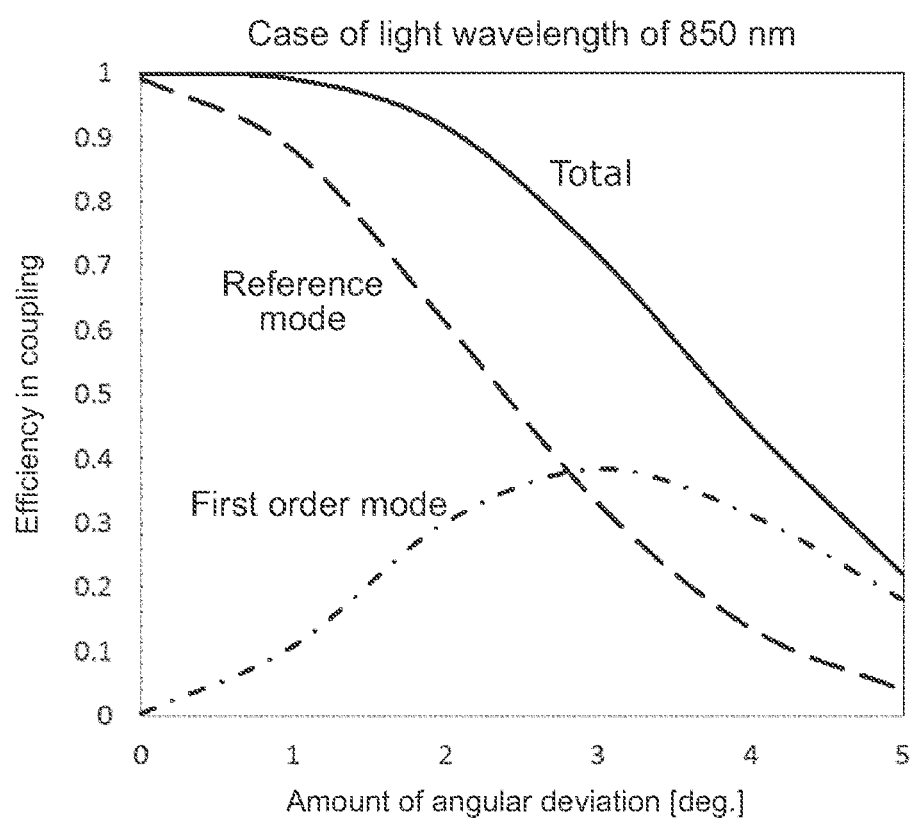
FIG. 16 is a graph describing the fact that the reference mode is converted into the first order mode according to the deviation.

In a graph of FIG. 16, a component of a reference mode (zero order mode) and a component of a first order mode are separately given, and the sum of them is represented by a curve Total. It is understood that the reference mode is converted into the first order mode according to the deviation since there is only the reference mode for input light. On the other hand, in the case of 1310 nm, there is a simple reduction in reference mode, as illustrated in FIG. 14, since propagation is performed only in the reference mode, as illustrated in FIG. 3A.

The case of 1310 nm and the case of 850 nm are compared with reference to FIG. 14. It is possible to relax the accuracy with respect to an angular deviation by a factor of about 1.7 when the comparison is performed at an efficiency in coupling of 0.8 (about −1 dB), and to relax the accuracy with respect to an angular deviation by a factor of about 2.1 when the comparison is performed at an efficiency in coupling of 0.9 (about −0.5 dB).

Figure 17A:
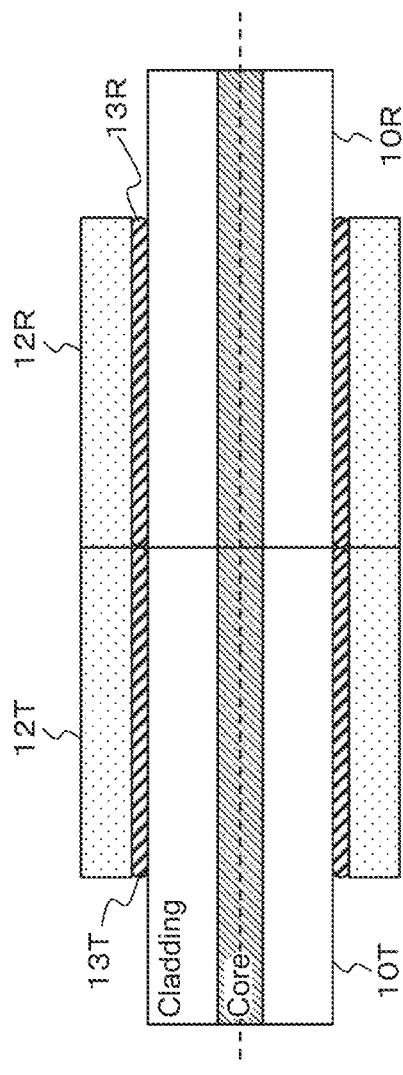
FIGS. 17A and 17B are diagrams describing the fact that the present technology is applicable to the optical communications respectively performed by the PC connection and the spatial coupling.
Figure 17B:
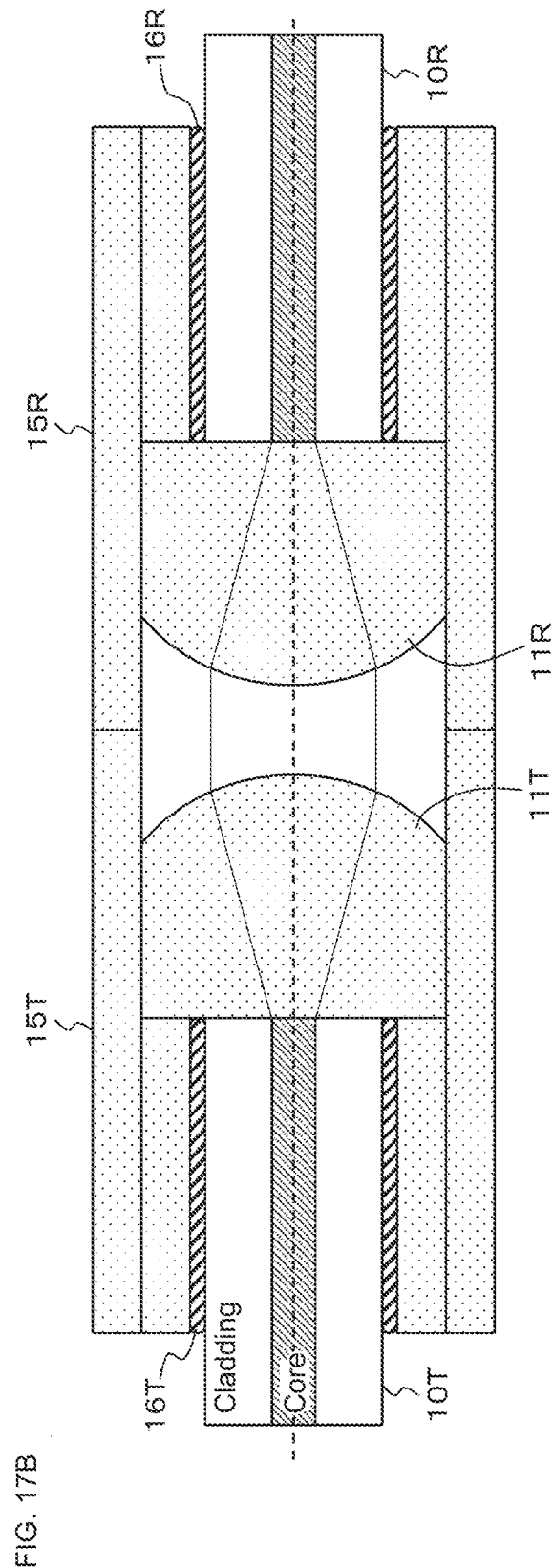

The present technology is applicable to an optical communication performed by a PC connection as illustrated in FIG. 17A, and to an optical communication performed by optical coupling as illustrated in FIG. 17B, and can provide a communication apparatus, a transmitter, a connector, a cable, a receiver, and a communication system in which the accuracy is more relaxed, compared to the case of a normal single-mode transmission.

Transmission-and-Reception System

Figure 18:
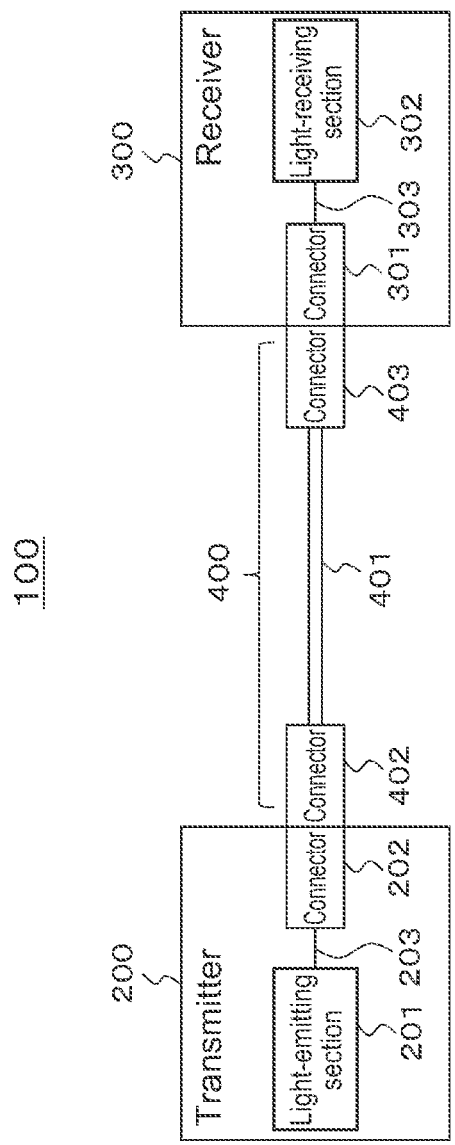
FIG. 18 is a block diagram illustrating an example of a configuration of a transmission-and-reception system according to embodiments.

FIG. 18 illustrates a transmission-and-reception system 100 according to the embodiments. The transmission-and-reception system 100 includes a transmitter 200, a receiver 300, and a cable 400. Examples of the transmitter 200 include AV sources such as a personal computer, a game machine, a disc player, a set-top box, a digital camera, and a cellular phone. Examples of the receiver 300 include a television receiver and a projector. The transmitter 200 and the receiver 300 are connected to each other through the cable 400.

The transmitter 200 includes a light-emitting section 201, a connector 202 that serves as a receptacle, and an optical fiber 203 that propagates, to the connector 202, light emitted by the light-emitting section 201. The light-emitting section 102 includes a laser element such as a vertical-cavity surface-emitting laser (VCSEL), or a light-emitting element such as a light-emitting diode (LED). The light-emitting section 201 converts, into an optical signal, an electric signal (a transmission signal) generated by a transmission circuit (not illustrated). The optical signal emitted by the light-emitting section 201 is propagated to the connector 202 through the optical fiber 203.

Further, the receiver 300 includes a connector 301 that serves as a receptacle, a light-receiving section 302, and an optical fiber 303 that propagates, to the light-receiving section 302, light obtained by the connector 301. The light-receiving section 302 includes a light-receiving element such as a photodiode. The light-receiving section 302 converts, into an electric signal (a reception signal), an optical signal transmitted from the connector 301, and supplies the electric signal to a reception circuit (not illustrated).

The cable 400 includes an optical fiber 401, and connectors 402 and 403 that are respectively situated at one end of the optical fiber 401 and at the other end of the optical fiber 401, the connectors 402 and 403 each serving as a plug. The connector 402 at one end of the optical fiber 401 is connected to the connector 202 of the transmitter 200, and the connector 403 at the other end of the optical fiber 401 is connected to the connector 301 of the receiver 300.

In the embodiments, the optical fiber 203 of the transmitter 200, the optical fiber 303 of the receiver 300, and the optical fiber 401 of the cable 400 perform propagation only in a reference mode at a first wavelength. Further, these optical fibers are configured such that the wavelength dispersion is zero at the first wavelength. For example, settings are performed such that the first wavelength is 1310 nm, and such that the core diameter d is 8 µm and the numerical aperture NA is 0.1, which respectively represent typical parameters for a 1310 nm optical fiber. This results in the normalized frequency V=1.92. Thus, these optical fibers serve as a single-mode fiber at a wavelength of 1310 nm (refer to FIGS. 3A and 3B).

Further, in the embodiments, these optical fibers perform communication using light of a second wavelength that can propagate in at least the first order mode in addition to the reference mode. Specifically, the second wavelength is 850 nm. When light of 850 nm is used, the normalized frequency V=2.96 in these optical fibers. Thus, the optical fibers can perform propagation in the first order mode in addition to the reference mode, and they serve as a double-mode fiber (refer to FIGS. 8A and 8B).

In the transmitter 200, light of 850 nm that is emitted by the light-emitting section 201 enters the optical fiber 203, which is a 1310 nm single-mode fiber, and is propagated to the connector 202. In this case, when the light entering the optical fiber 203 deviates with respect to an optical axis or deviates angularly, propagation is performed in a first order mode in addition to a reference mode, the first order mode being generated due to the deviation with respect to the optical axis or the angular deviation. This results in a reduction in a loss of coupling of optical power (refer to FIGS. 10 and 14). This makes it possible to relax the accuracy with respect to a deviation with respect to an optical axis or an angular deviation, and thus to reduce costs.

Further, in a portion of connection between the connector 202 of the transmitter 200 and the connector 402 of the cable 400, the light of 850 nm exiting from the connector 202 enters the optical fiber 401, which is a 1310 nm single-mode fiber, and is propagated to the receiver 300. In this case, when the light entering the optical fiber 401 deviates with respect to an optical axis or deviates angularly, propagation is performed in the first order mode in addition to the reference mode, the first order mode being generated due to the deviation with respect to the optical axis or the angular deviation. This results in a reduction in a loss of coupling of optical power (refer to FIGS. 10 and 14). This makes it possible to relax the accuracy with respect to a deviation with respect to an optical axis or an angular deviation, and thus to reduce costs.

Furthermore, in a portion of connection between the connector 403 of the cable 400 and the connector 301 of the receiver 300, the light of 850 nm exiting from the connector 403 enters the optical fiber 303, which is a 1310 nm single-mode fiber, and is propagated to the light-receiving section 302. In this case, when the light entering the optical fiber 303 deviates with respect to an optical axis or deviates angularly, propagation is performed in the first order mode in addition to the reference mode, the first order mode being generated due to the deviation with respect to the optical axis or the angular deviation. This results in a reduction in a loss of coupling of optical power (refer to FIGS. 10 and 14). This makes it possible to relax the accuracy with respect to a deviation with respect to an optical axis or an angular deviation, and thus to reduce costs.

Figure 19:
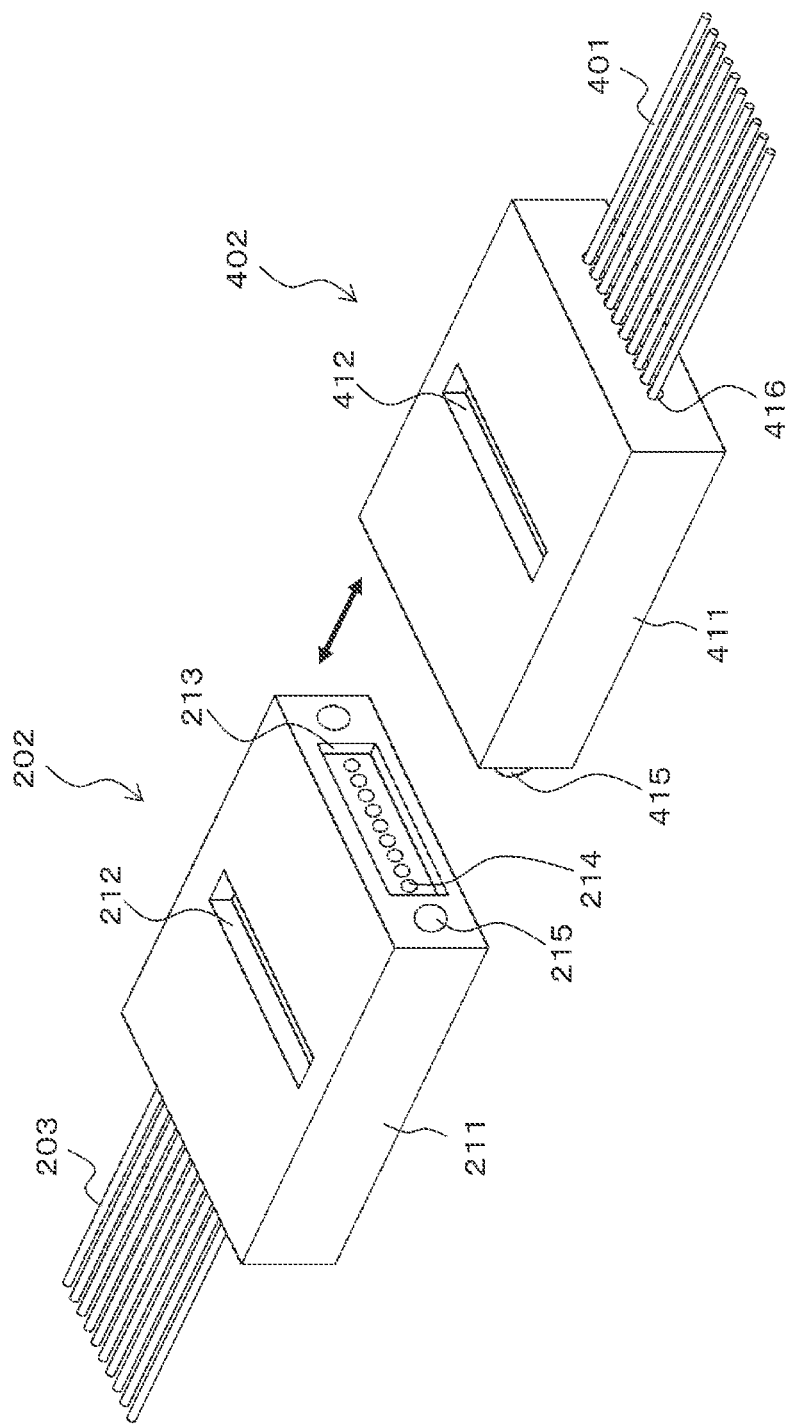
FIG. 19 is a perspective view illustrating an example of a configuration of a connector of a transmitter and a connector of a cable.
Figure 20:
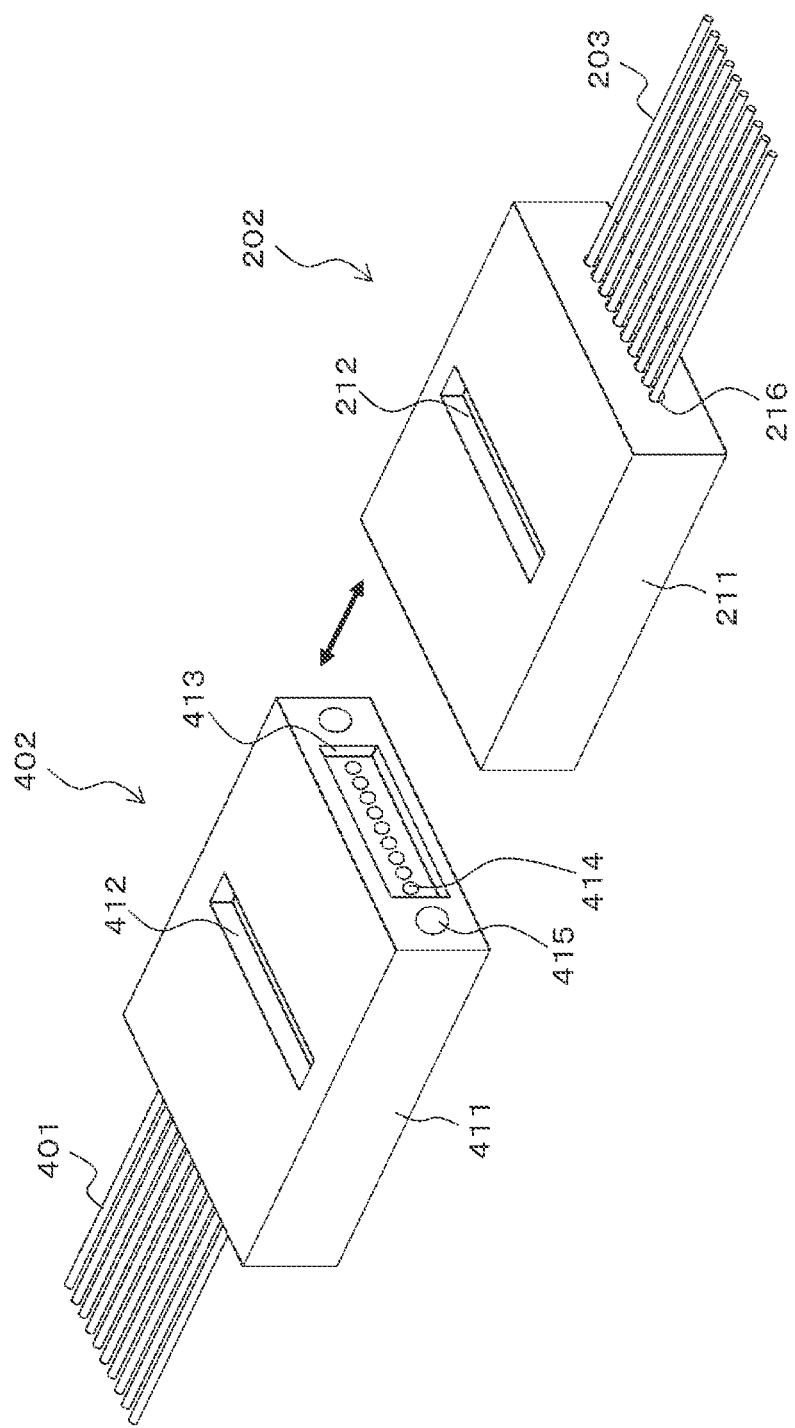
FIG. 20 is a perspective view illustrating the example of the configuration of the connector of the transmitter and the connector of the cable.

FIG. 19 is a perspective view illustrating an example of a configuration of the connector 202 of the transmitter 200 and the connector 402 of the cable 400. FIG. 20 is also a perspective view illustrating the example of the configuration of the connector 202 of the transmitter 200 and the connector 402 of the cable 400, as viewed from a direction opposite to a direction from which the configurations are viewed in FIG. 19. The illustrated example meets a parallel transmission of optical signals of a plurality of channels. Note that the configuration that meets a parallel transmission of optical signals of a plurality of channels is illustrated here, but it is also possible to provide a configuration that meets a transmission of an optical signal of a channel, although a detailed description thereof is omitted.

The connector 202 has a connector body (a ferrule) 211 of which an appearance has a shape of a substantially rectangular parallelepiped. A plurality of horizontally arranged optical fibers 203 respectively corresponding to channels is connected on the side of a rear face of the connector body 211. Ends of the respective optical fibers 203 are respectively inserted into optical fiber inserting holes 216 to fix the optical fibers 203.

Further, an adhesive injection hole 212 that includes a rectangular opening is formed on the side of an upper face of the connector body 211. An adhesive used to fix the optical fiber 203 to the connector body 211 is injected through the adhesive injection hole 212.

Furthermore, a concave light exit portion (a light transmission space) 213 that includes a rectangular opening is formed on the side of a front face of the connector body 211, and a plurality of horizontally arranged lenses (convex lenses) 214 respectively corresponding to channels is formed in a bottom portion of the light exit portion 213. This prevents the surface of the lens 214 from unintendedly coming into contact with, for example, a counterpart connector and from being damaged.

Moreover, a convex or concave position regulator 215 used to align the connector 202 with the connector 402 is integrally formed on the side of the front face of the connector body 211, where the position regulator 215 is concave in the illustrated example. This makes it possible to easily perform an optical-axis alignment when the connector 202 is connected to the connector 402.

The connector 402 has a connector body (a ferrule) 411 of which an appearance has a shape of a substantially rectangular parallelepiped. A plurality of horizontally arranged optical fibers 401 respectively corresponding to channels is connected on the side of a rear face of the connector body 411. Ends of the respective optical fibers 401 are respectively inserted into optical fiber inserting holes 416 to fix the optical fibers 401.

Further, an adhesive injection hole 412 that includes a rectangular opening is formed on the side of an upper face of the connector body 411. An adhesive used to fix the optical fiber 401 to the connector body 411 is injected through the adhesive injection hole 412.

Furthermore, a concave light entrance portion (a light transmission space) 413 that includes a rectangular opening is formed on the side of a front face of the connector body 411, and a plurality of horizontally arranged lenses (convex lenses) 414 respectively corresponding to channels is formed in a bottom portion of the light entrance portion 413. This prevents the surface of the lens 414 from unintendedly coming into contact with, for example, a counterpart connector and from being damaged.

Moreover, a concave or convex position regulator 415 used to align the connector 402 with the connector 202 is integrally formed on the side of the front face of the connector body 411, where the position regulator 415 is convex in the illustrated example. This makes it possible to easily perform an optical-axis alignment when the connector 402 is connected to the connector 202. Note that the position regulator 415 is not limited to being formed integrally with the connector body 411, and the formation may be performed using a pin or by another method.

Figure 21A:
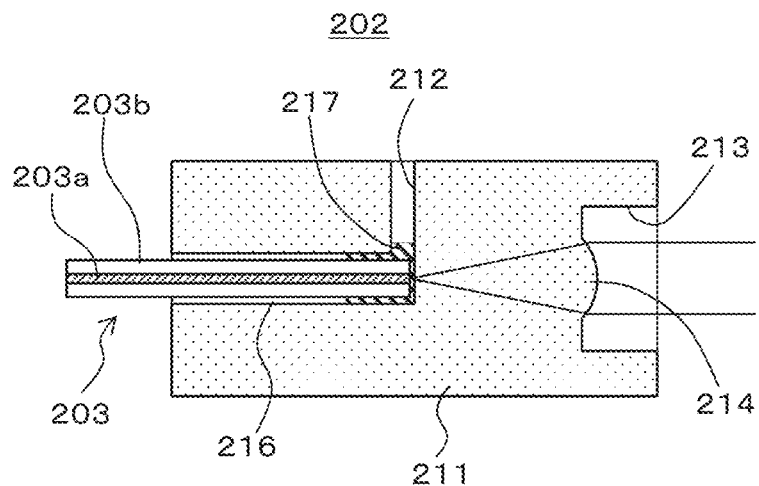
FIGS. 21A and 21B are set of cross-sectional views illustrating examples of the connector of the transmitter and the connector of the cable.

FIG. 21A is a cross-sectional view illustrating an example of the connector 202 of the transmitter 200. An illustration of the position regulator 215 (refer to FIG. 19) is omitted in the illustrated example. The connector 202 is further described with reference to FIG. 21A.

The connector 202 includes the connector body 211. The connector body 211 is made of, for example, a light-transmissive material such as synthetic resin or glass, or a material, such as silicon, through which a specific wavelength is transmitted, and the connector body 211 is in the form of a ferrule with a lens.

It is possible to easily align an optical fiber with a lens with respect to an optical axis when the connector body 211 is in the form of a ferrule with a lens, as described above. Further, when the connector body 211 is in the form of a ferrule with a lens, as described above, a multichannel communication can be easily performed just by inserting an optical fiber into a ferrule.

The concave light exit portion (the light transmission space) 213 is formed on the side of the front face of the connector body 211. Further, the plurality of horizontally arranged lenses (convex lenses) 214 respectively corresponding to channels is formed integrally with the connector body 211 to be situated in the bottom portion of the light exit portion 213.

Further, a plurality of optical fiber inserting holes 216 horizontally arranged correspondingly to the lenses 214 for the respective channels is provided to the connector body 211, each optical fiber inserting hole 214 extending forward from the side of the rear face of the connector body 211. The optical fiber 203 has a two-layer structure including a core 203*a* and cladding 203*b*, the core 203*a* being a center portion that serves as a light path, the cladding 203*b* covering a peripheral surface of the core 203*a*.

The optical fiber inserting hole 216 for each channel is formed such that the core 203*a* of the optical fiber 203 inserted into the optical fiber inserting hole 216 coincides the optical axis of a corresponding lens 214. Further, the optical fiber inserting hole 216 for each channel is formed such that a bottom of the optical fiber inserting hole 216, that is, a contact portion of the optical fiber inserting hole 216 coincides a focal point of the lens 214, the contact portion of the optical fiber inserting hole 216 being a portion with which the end (an exit end) of the optical fiber 203 is brought into contact when the optical fiber 203 is inserted into the optical fiber inserting hole 216.

Further, the adhesive injection hole 212 extending downward from the side of the upper face of the connector body 211 is formed in the connector body 211 such that the adhesive injection hole 212 communicates with a portion situated around the bottoms of the plurality of horizontally arranged optical fiber inserting holes 216. After the optical fiber 203 is inserted into the optical fiber inserting hole 216, an adhesive 217 is injected into a portion situated around the optical fiber 203 through the adhesive injection hole 212. This results in fixing the optical fiber 203 to the connector body 211.

In the connector 202, the lens 214 operates to form light exiting from the optical fiber 203 into collimated light and to cause the collimated light to exit. Accordingly, light that exits from the exit end of the optical fiber 203 with a specified NA enters the lens 214, and is formed into collimated light, and then the collimated light exits from the lens 214.

Figure 21B:
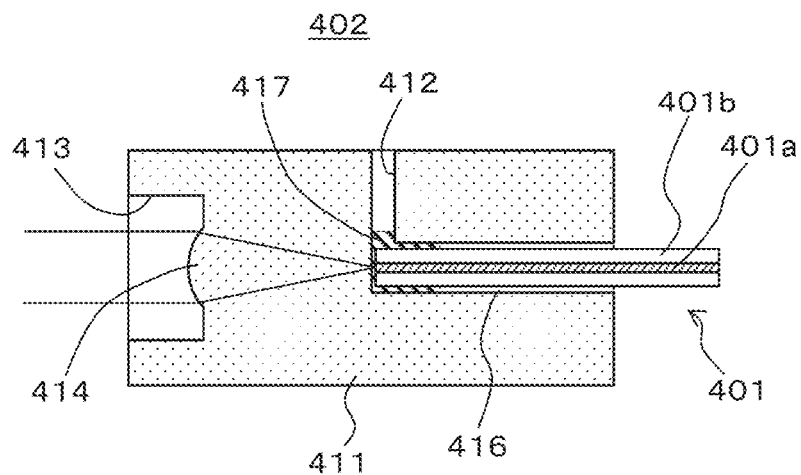

FIG. 21B is a cross-sectional view illustrating an example of the connector 402 of the cable 400. An illustration of the position regulator 415 (refer to FIGS. 19 and 20) is omitted in the illustrated example. The connector 402 is further described with reference to FIG. 21B.

The connector 402 includes the connector body 411. The connector body 411 is made of, for example, a light-transmissive material such as synthetic resin or glass, or a material, such as silicon, through which a specific wavelength is transmitted, and the connector body 411 is in the form of a ferrule with a lens.

The concave light entrance portion (the light transmission space) 413 is formed on the side of the front face of the connector body 411. Further, the plurality of horizontally arranged lenses (convex lenses) 414 respectively corresponding to channels is formed integrally with the connector body 411 to be situated in the bottom portion of the light entrance portion 413.

Further, a plurality of optical fiber inserting holes 416 horizontally arranged correspondingly to the lenses 414 for the respective channels is provided to the connector body 411, each optical fiber inserting hole 416 extending forward from the side of the rear face of the connector body 411. The optical fiber 401 has a two-layer structure including a core 401*a* and cladding 401*b*, the core 401*a* being a center portion that serves as a light path, the cladding 401*b* covering a peripheral surface of the core 401*a*.

The optical fiber inserting hole 416 for each channel is formed such that the core 401*a* of the optical fiber 401 inserted into the optical fiber inserting hole 416 coincides the optical axis of a corresponding lens 414. Further, the optical fiber inserting hole 416 for each channel is formed such that a bottom of the optical fiber inserting hole 416, that is, a contact portion of the optical fiber inserting hole 416 coincides a focal point of the lens 414, the contact portion of the optical fiber inserting hole 416 being a portion with which the end (an entrance end) of the optical fiber 401 is brought into contact when the optical fiber 401 is inserted into the optical fiber inserting hole 416.

Further, the adhesive injection hole 412 extending downward from the side of the upper face of the connector body 411 is formed in the connector body 411 such that the adhesive injection hole 412 communicates with a portion situated around the bottoms of the plurality of horizontally arranged optical fiber inserting holes 416. After the optical fiber 401 is inserted into the optical fiber inserting hole 416, an adhesive 417 is injected into a portion situated around the optical fiber 401 through the adhesive injection hole 412. This results in fixing the optical fiber 401 to the connector body 411.

In the connector 402 of the cable 400, the lens 414 operates to collect entering collimated light. In this case, the collimated light enters the lens 414, and is collected by the lens 414. The collected light enters the entrance end of the optical fiber 401 with a specified NA.

Figure 22:
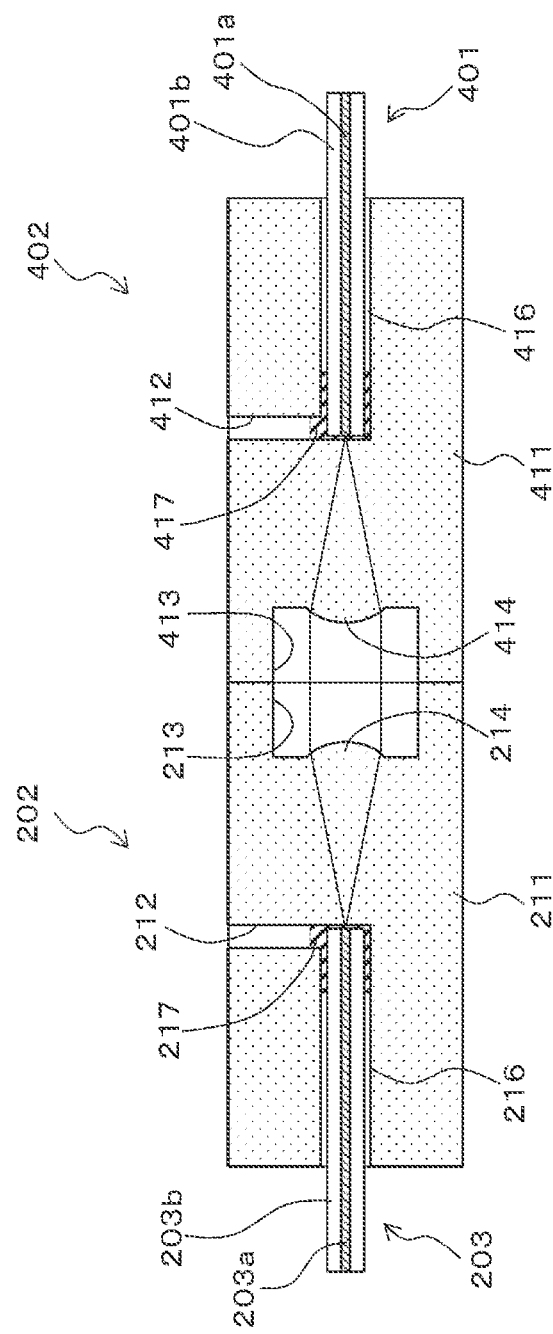
FIG. 22 is a cross-sectional view illustrating the connector of the transmitter and the connector of the cable being connected to each other.

FIG. 22 is a cross-sectional view illustrating the connector 202 of the transmitter 200 and the connector 402 of the cable 400 being connected to each other. In the connector 202, light transmitted through the optical fiber 203 exits from the exit end of the optical fiber 203 with a specified NA. The exiting light enters the lens 214, and is formed into collimated light. The collimated light exits from the lens 214 toward the connector 402.

Further, in the connector 402, the light exiting from the connector 202 enters the lens 414, and is collected by the lens 414. Then, the collected light enters the entrance end of the optical fiber 401, and is transmitted through the optical fiber 401.

Note that the connector 403 of the cable 400 and the connector 301 of the receiver 300 have a configuration similar to the above-described example of the configuration of the connector 202 of the transmitter 200 and the connector 402 of the cable 400, although a detailed description thereof is omitted.

Figure 23:
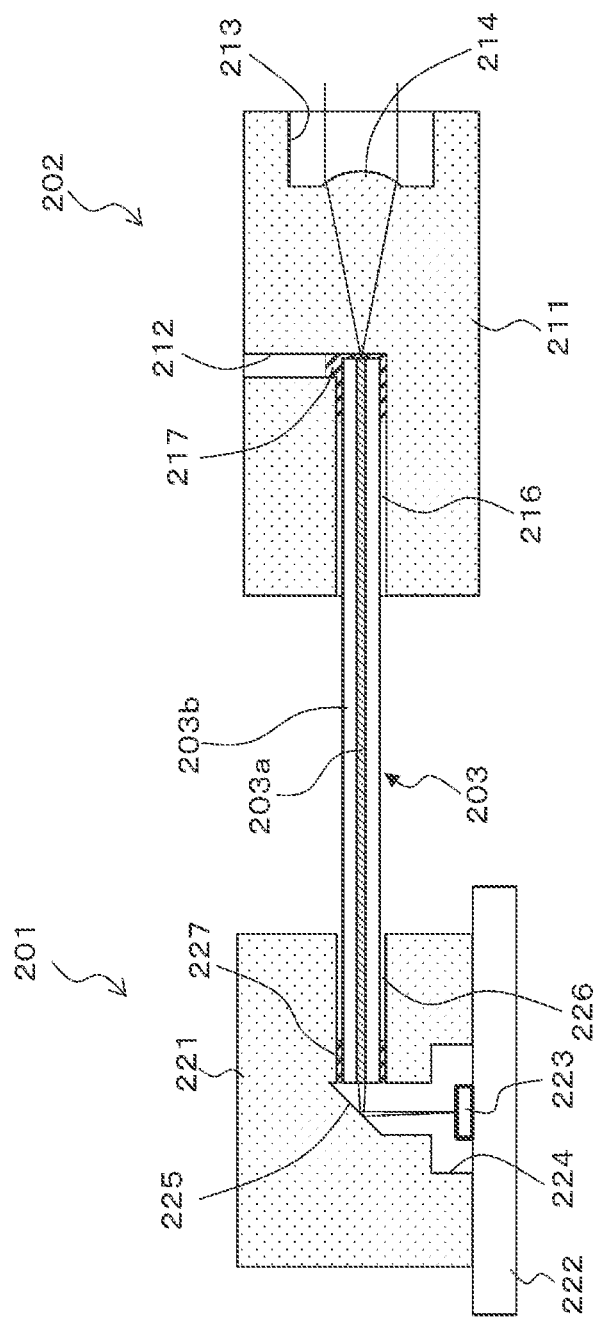
FIG. 23 is a cross-sectional view illustrating an example of a configuration of a light-emitting section and the connector that are included in the transmitter.

FIG. 23 illustrates an example of a configuration of the light-emitting section 201 and the connector 202 that are included in the transmitter 200. As described above, the transmitter 200 meets a parallel transmission of optical signals of a plurality of channels. The figure only illustrates an example of a configuration of one channel.

The light-emitting section 201 includes a ferrule 221. The ferrule 221 is made of, for example, a light-transmissive material such as synthetic resin or glass, or a material, such as silicon, through which a specific wavelength is transmitted.

A plurality of horizontally arranged optical fiber inserting holes 226 each extending rearward from the side of a front face of the ferrule 221 is provided to the ferrule 221. After the optical fiber 203 for each channel is inserted into the optical fiber inserting hole 226, the optical fiber 203 is fixed to the ferrule 221 using an adhesive 227.

Further, a substrate 222 on which a light-emitting element 223 is placed is fixed on the side of a lower face of the ferrule 221. In this case, a plurality of light-emitting elements 223 horizontally arranged correspondingly to the optical fibers 203 for the respective channels is placed on the substrate 222. Here, the position of the substrate 222 is adjusted and the substrate 222 is fixed, such that an exit portion of the light-emitting element 223 for each channel coincides the optical axis of a corresponding optical fiber 203.

Further, a light-emitting-element arranging hole 224 extending upward from the side of the lower face is formed in the ferrule 221. Further, a bottom portion of the light-emitting-element arranging hole 224 includes an inclined surface in order to change, to a direction of a corresponding optical fiber 203, the direction of a path of light coming from the light-emitting element 223 for each channel, and a mirror (a light path changing portion) 225 is arranged on the inclined surface. Note that the mirror 225 is not limited to being separately generated and being fixed on the inclined surface, and the mirror 225 may be formed on the inclined surface by, for example, vapor deposition.

The configuration of the connector 202 is similar to its configuration described above with reference to FIG. 21A. Thus, the description thereof is omitted here.

In the light-emitting section 201, light that exits from the exit portion of the light-emitting element 223 with a specified NA enters the optical fiber 203 after a path of the light is changed by the mirror 225. The light entering the optical fiber 203 is transmitted to the connector 202 through the optical fiber 203. Then, in the connector 202, the light transmitted through the optical fiber 203 exits from the exit end of the optical fiber 203 with a specified NA. The exiting light enters the lens 214, and is formed into collimated light, and the collimated light exits from the lens 214.

The optical fibers 401, 303, and 203 in the transmission-and-reception system 100 illustrated in FIG. 18 are 1310 nm single-mode fibers, and communication is performed using light of 850 nm. Thus, the optical fibers 401, 303, and 203 can perform propagation in a first order mode in addition to a reference mode, and they serve as a double-mode fiber (refer to FIGS. 8A and 8B). Therefore, when entering light deviates with respect to an optical axis or deviates angularly, propagation is performed in a first order mode in addition to a reference mode, the first order mode being generated due to the deviation with respect to the optical axis or the angular deviation. This results in a reduction in a loss of coupling of optical power (refer to FIGS. 10 and 14). This makes it possible to relax the accuracy with respect to a deviation with respect to an optical axis or an angular deviation, and thus to reduce costs.

2. Modifications

The example in which the first wavelength is 1310 nm has been described in the embodiments above. However, a laser light source or an LED light source may be used as a light source. Thus, the first wavelength may be a wavelength of, for example, between 300 nm and 5 μm.

Further, the first wavelength may be a wavelength in the 1310 nm band including 1310 nm, although the example in which the first wavelength is 1310 nm has been described in the embodiments above. Furthermore, the first wavelength may be 1550 nm, or may be a wavelength in the 1550 nm band including 1550 nm, although the example in which the first wavelength is 1310 nm has been described in the embodiments above. Moreover, the second wavelength may be a wavelength in the 850 nm band including 850 nm, although the example in which the second wavelength is 850 nm has been described in the embodiments above.

Further, of course, the present technology is also applicable when the optical waveguide is an optical waveguide other than an optical fiber such as a silicon optical waveguide, although the example in which the optical waveguide is an optical fiber has been described in the embodiments above.

The favorable embodiments of the present disclosure have been described above in detail with reference to the accompanying drawings. However, the technical scope of the present disclosure is not limited to these examples. It is clear that persons who have common knowledge in the technical field of the present disclosure could conceive various alternations or modifications within the scope of a technical idea according to an embodiment of the present disclosure. It is understood that of course such alternations or modifications also fall under the technical scope of the present disclosure.

Further, the effects described herein are not limitative, but are merely descriptive or illustrative. In other words, the technology according to the present disclosure may provide other effects apparent to those skilled in the art from the description herein, in addition to, or instead of the effects described above.

Note that the present technology may also take the following configurations.

(1) An optical communication apparatus, including
an optical waveguide that performs propagation only in a reference mode at a first wavelength, the optical communication apparatus performing communication using light of a second wavelength that enables the optical waveguide to perform propagation in at least a first order mode in addition to the reference mode.

(2) The optical communication apparatus according to (1), in which
the first wavelength is a wavelength at which a wavelength dispersion is zero.

(3) The optical communication apparatus according to (1) or (2), in which
the first wavelength is a wavelength of between 300 nm and 5 μm.

(4) The optical communication apparatus according to (1), in which
the first wavelength is a wavelength in a 1310 nm band or a wavelength in a 1550 nm band.

(5) The optical communication apparatus according to (1), in which
the second wavelength is a wavelength in an 850 nm band.

(6) The optical communication apparatus according to any one of (1) to (5), in which
the optical waveguide is an optical fiber.

(7) The optical communication apparatus according to any one of (1) to (5), in which
the optical waveguide is a silicon optical waveguide.

(8) An optical communication method that is performed by an optical communication apparatus that includes an optical waveguide that performs propagation only in a reference mode at a first wavelength, the optical communication method including
performing communication using light of a second wavelength that enables the optical waveguide to perform propagation in at least a first order mode in addition to the reference mode.

(9) An optical communication system, including:
a reception section that includes an optical waveguide that performs propagation only in a reference mode at a first wavelength; and
a transmission section from which light of a second wavelength enters the optical waveguide of the reception section, the second wavelength enabling the optical waveguide to perform propagation in at least a first order mode in addition to the reference mode.

(10) The optical communication system according to (9), in which
the transmission section is a light-emitting element, a receptacle of a transmitter, or a plug of a cable.

REFERENCE SIGNS LIST 100 transmission-and-reception system
200 transmitter
201 light-emitting section
202 connector (receptacle)
203 optical fiber
203a core
203b cladding
211 connector body
212 adhesive injection hole
213 light exit portion (light transmission space)
214 lens (convex lens)
215 position regulator
216 optical fiber inserting hole
217 adhesive
221 ferrule
222 substrate
223 light-emitting element
224 light-emitting-element arranging hole
225 mirror
226 optical fiber inserting hole
227 adhesive
300 receiver
301 connector (receptacle)
302 light-receiving section
303 optical fiber
400 cable
401 optical fiber
401a core
401b cladding
402, 403 connector (plug)
411 connector body
412 adhesive injection hole
413 light entrance portion (light transmission space)
414 lens (convex lens)
415 position regulator
416 optical fiber inserting hole
417 adhesive

The invention claimed is:
1. An optical communication apparatus, comprising:
an optical waveguide configured to receive at first wavelength and to perform propagation in a reference mode; and
circuitry configured to transmit light of a second wavelength to the optical waveguide, wherein
a portion of the reference mode is converted into a first order mode when there is an angular deviation of the light,
the optical waveguide is further configured to propagate, based on communication with the light of the second wavelength, at least the first order mode in addition to the reference mode, and
the communication with the light of the second wavelength is based on the angular deviation of the light.

2. The optical communication apparatus according to claim 1, wherein the first wavelength is a wavelength at which a wavelength dispersion is zero.

3. The optical communication apparatus according to claim 1, wherein the first wavelength is a wavelength between 300 nm and 5 μm.

4. The optical communication apparatus according to claim 3, wherein the first wavelength is a wavelength in a 1310 nm band or a wavelength in a 1550 nm band.

5. The optical communication apparatus according to claim 1, wherein the second wavelength is a wavelength in an 850 nm band.

6. The optical communication apparatus according to claim 1, wherein the optical waveguide is an optical fiber.

7. The optical communication apparatus according to claim 1, wherein the optical waveguide is a silicon optical waveguide.

8. An optical communication method, comprising:
in an optical communication apparatus that includes an optical waveguide that performs propagation in a reference mode at a first wavelength,
transmitting light of a second wavelength to the optical waveguide,
converting a portion of the reference mode into a first order mode when there is an angular deviation of the light,
propagation the optical waveguide, based on communication with the light of the second wavelength, in at least the first order mode in addition to the reference mode, and
the communication with the light of the second wavelength is based on the angular deviation of the light.

9. An optical communication system, comprising:
a reception section that includes an optical waveguide configured to perform propagation in a reference mode at a first wavelength; and
a transmission section configured to emit light of a second wavelength that enters the optical waveguide of the reception section, wherein
a portion of the reference mode is converted into a first order mode when there is an angular deviation of the light,
the second wavelength enables the optical waveguide to perform propagation in at least the first order mode in addition to the reference mode, and
the light of the second wavelength is emitted based on the angular deviation of the light.

10. The optical communication system according to claim 9, wherein the transmission section is one of a light-emitting element, a receptacle of a transmitter, or a plug of a cable.

* * * * *